United States Patent
Park et al.

(10) Patent No.: US 11,875,574 B2
(45) Date of Patent: Jan. 16, 2024

(54) OBJECT RECOGNITION METHOD OF AUTONOMOUS DRIVING DEVICE, AND AUTONOMOUS DRIVING DEVICE

(71) Applicant: SAMSUNG ELECTRONICS CO., LTD., Suwon-si (KR)

(72) Inventors: Gyu-tae Park, Suwon-si (KR); Sejin Kwak, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 442 days.

(21) Appl. No.: 17/278,018

(22) PCT Filed: Sep. 26, 2019

(86) PCT No.: PCT/KR2019/012484
§ 371 (c)(1),
(2) Date: Mar. 19, 2021

(87) PCT Pub. No.: WO2020/071683
PCT Pub. Date: Apr. 9, 2020

(65) Prior Publication Data
US 2021/0350145 A1    Nov. 11, 2021

(30) Foreign Application Priority Data
Oct. 5, 2018    (KR) .................. 10-2018-0119303

(51) Int. Cl.
*G06V 20/58*    (2022.01)
*G06T 7/246*    (2017.01)
(Continued)

(52) U.S. Cl.
CPC ......... *G06V 20/58* (2022.01); *B60W 60/0027* (2020.02); *G05D 1/0246* (2013.01);
(Continued)

(58) Field of Classification Search
CPC ........ G06V 20/58; G06V 10/40; G06V 10/82; G06V 20/56; G06V 10/50; G06V 10/56;
(Continued)

(56) References Cited

U.S. PATENT DOCUMENTS 10,237,506 B2    3/2019    Park et al.
10,338,600 B2    7/2019    Yoon et al.
(Continued)

FOREIGN PATENT DOCUMENTS

| CN | 106991650 A | 7/2017 |
| CN | 107797549 A | 3/2018 |

(Continued)

OTHER PUBLICATIONS

Shim, et al., "Gradient-based Camera Exposure Control for Outdoor Mobile Platforms", IEEE Transactions on Circuits and Systems for Video Technology, Aug. 24, 2017, XP 081325040, 14 pages total.

(Continued)

*Primary Examiner* — Aaron W Carter
(74) *Attorney, Agent, or Firm* — Sughrue Mion, PLLC

(57) ABSTRACT

Disclosed is an object recognition method including: obtaining a first RGB image by using a camera; predicting at least one first region, in which an object is unrecognizable, in the first RGB image based on brightness information of the first RGB image; determining at least one second region, in which an object exists, from among the at least one first region, based on object information obtained through a dynamic vision sensor; obtaining an enhanced second RGB image by controlling photographic configuration information of the camera in relation to the at least one second region; and recognizing the object in the second RGB image.

20 Claims, 20 Drawing Sheets

(51) Int. Cl.

| | |
|---|---|
| *G06T 7/70* | (2017.01) |
| *G06N 20/00* | (2019.01) |
| *B60W 60/00* | (2020.01) |
| *G05D 1/02* | (2020.01) |
| *G06V 20/56* | (2022.01) |
| *H04N 23/10* | (2023.01) |
| *H04N 23/70* | (2023.01) |
| *G06V 10/40* | (2022.01) |
| *G06V 10/82* | (2022.01) |

(52) U.S. Cl.
CPC .............. *G06N 20/00* (2019.01); *G06T 7/246* (2017.01); *G06T 7/70* (2017.01); *G06V 10/40* (2022.01); *G06V 10/82* (2022.01); *G06V 20/56* (2022.01); *H04N 23/10* (2023.01); *H04N 23/70* (2023.01); *B60W 2420/42* (2013.01); *G06T 2207/10024* (2013.01); *G06T 2207/20084* (2013.01); *G06T 2207/30252* (2013.01)

(58) Field of Classification Search
CPC ......... B60W 60/0027; B60W 2420/42; B60W 2554/20; B60W 40/02; G05D 1/0246; G05D 1/0212; G06N 20/00; G06T 7/246; G06T 7/70; G06T 2207/10024; G06T 2207/20084; G06T 2207/30252; H04N 23/10; H04N 23/70; H04N 23/60; H04N 23/71; H04N 23/73

See application file for complete search history.

(56) References Cited

U.S. PATENT DOCUMENTS

| | | | |
|---|---|---|---|
| 11,263,751 B2* | 3/2022 | Saha | .................. G06F 18/2431 |
| 2017/0069071 A1 | 3/2017 | Jung | |
| 2017/0084044 A1 | 3/2017 | Keh et al. | |
| 2017/0213324 A1 | 7/2017 | Wang et al. | |
| 2018/0060675 A1 | 3/2018 | Ji et al. | |
| 2018/0246521 A1* | 8/2018 | Seo | ...................... G05D 1/0246 |
| 2019/0289282 A1* | 9/2019 | Briggs | .................... G06T 7/593 |
| 2020/0090322 A1* | 3/2020 | Seo | ........................ G06N 3/084 |
| 2020/0134827 A1* | 4/2020 | Saha | .................. G06F 18/2431 |
| 2020/0218979 A1* | 7/2020 | Kwon | .................. B60W 30/14 |
| 2020/0333796 A1 | 10/2020 | Seo et al. | |
| 2020/0410274 A1* | 12/2020 | Satoh | ...................... G06V 20/58 |
| 2021/0110190 A1* | 4/2021 | Park | ........................ H04N 23/71 |
| 2021/0201070 A1* | 7/2021 | Omari | ................ G01C 21/3635 |
| 2021/0218875 A1* | 7/2021 | Saito | ........................ G06V 10/98 |
| 2021/0350145 A1* | 11/2021 | Park | ........................ H04N 23/73 |
| 2022/0207672 A1* | 6/2022 | Seo | ........................... G06T 5/50 |
| 2023/0009479 A1* | 1/2023 | Suzuki | ................ B60W 60/001 |
| 2023/0182654 A1* | 6/2023 | Chun | ...................... B60R 11/04 |
| | | | 348/148 |
| 2023/0186593 A1* | 6/2023 | Tryndin | ............... B60Q 1/1423 |
| | | | 315/82 |
| 2023/0256896 A1* | 8/2023 | Su | ......................... G06V 10/764 |
| | | | 315/82 |

FOREIGN PATENT DOCUMENTS

| | | |
|---|---|---|
| CN | 108513059 A | 9/2018 |
| KR | 10-2012-0052547 A | 5/2012 |
| KR | 10-2014-0146337 A | 12/2014 |
| KR | 10-2017-0028605 A | 3/2017 |
| KR | 10-2017-0074388 A | 6/2017 |
| KR | 10-2018-0025591 A | 3/2018 |
| KR | 10-2018-0040209 A | 4/2018 |
| WO | 2017/165627 A1 | 9/2017 |

OTHER PUBLICATIONS

Communication dated Oct. 8, 2021 by the European Patent Office in European Patent Application No. 19869994.4.
Communication dated Dec. 13, 2022 issued by the Korean Intellectual Property Office in Korean Patent Application No. 10-2018-0119303.
International Search Report (PCT/ISA/210) and Written Opinion (PCT/ISA/237) dated Jan. 3, 2020 issued by the International Searching Authority in International Application No. PCT/KR2019/012484.
Communication dated Aug. 23, 2023, issued by the European Patent Office in European Application No. 19869994.4.
Communication dated Sep. 29, 2023, issued by the National Intellectual Property Administration of PR China in Chinese Patent Application 201980065499.5.

* cited by examiner

FIG. 3
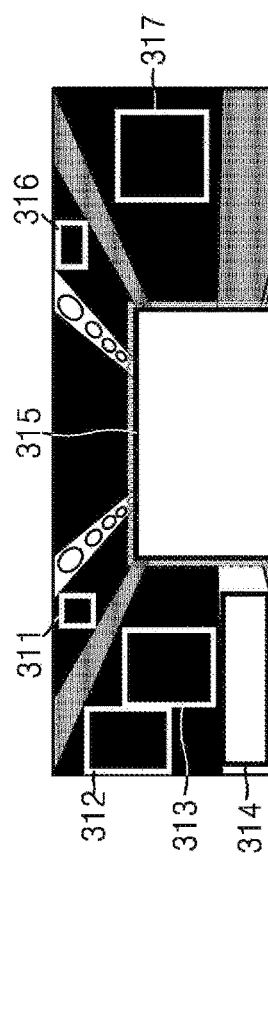
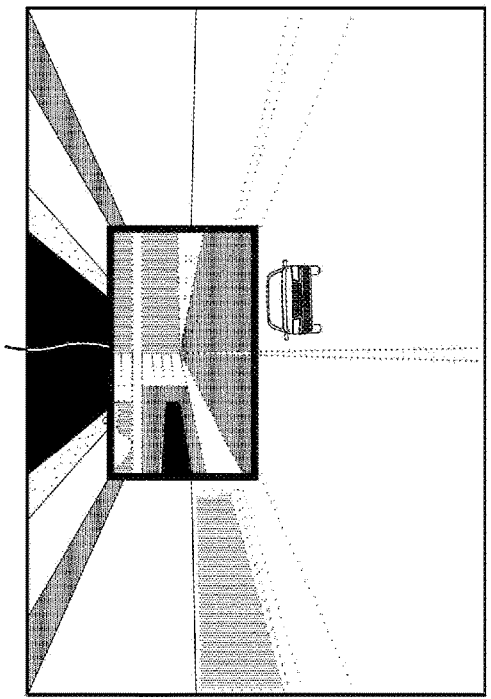
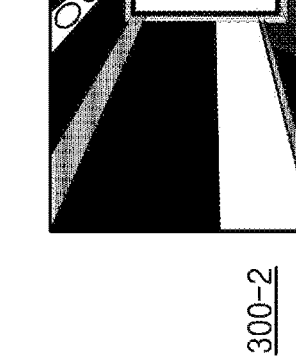

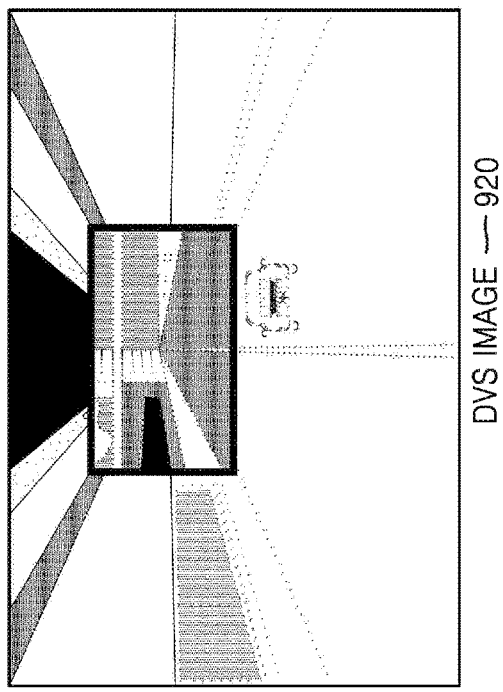
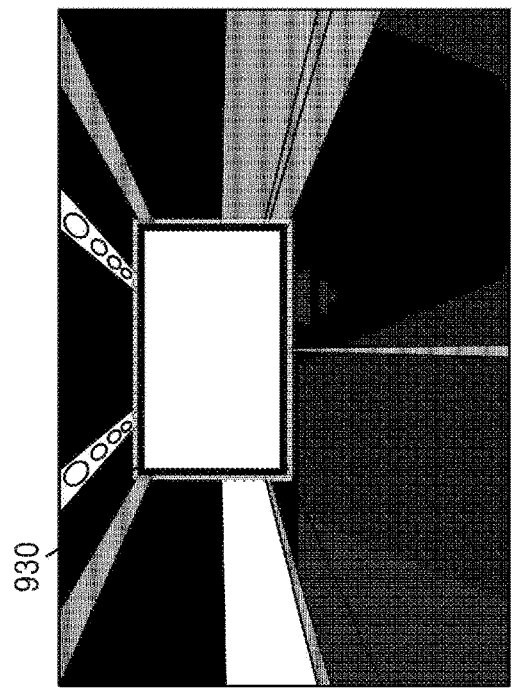
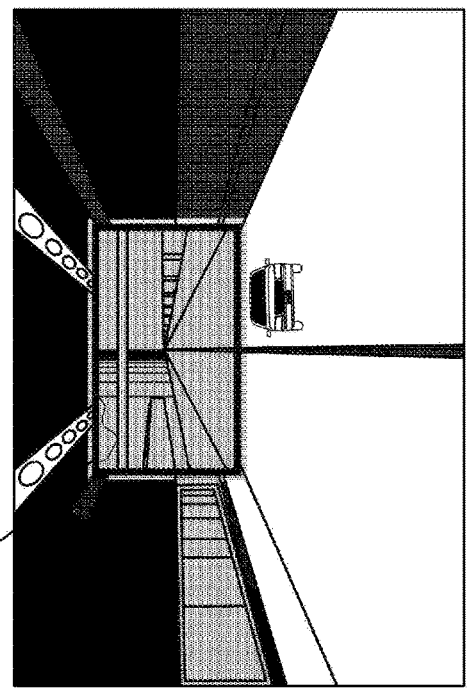
FIG. 10

FIG. 11
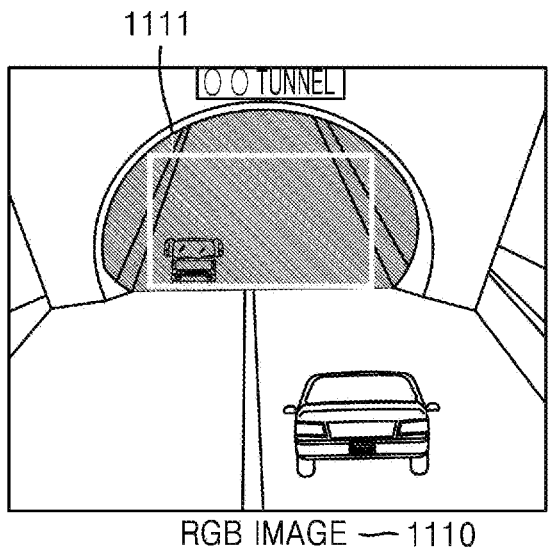
RGB IMAGE — 1110
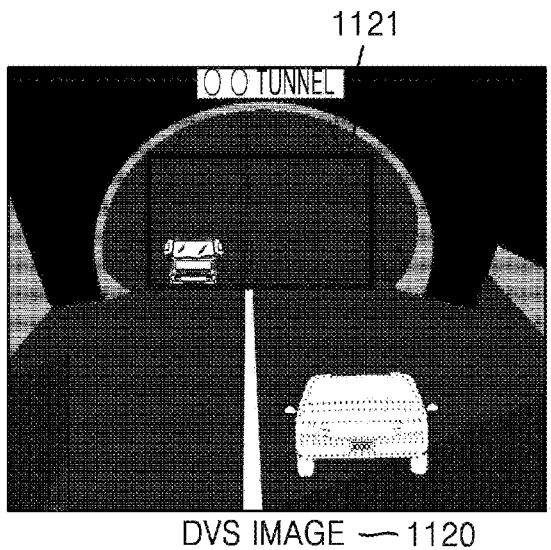
DVS IMAGE — 1120
⬇ ENHANCEMENT
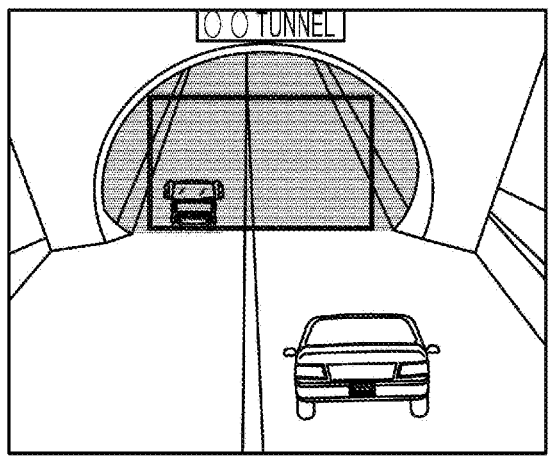
ENHANCED RGB IMAGE — 1130

FIG. 14
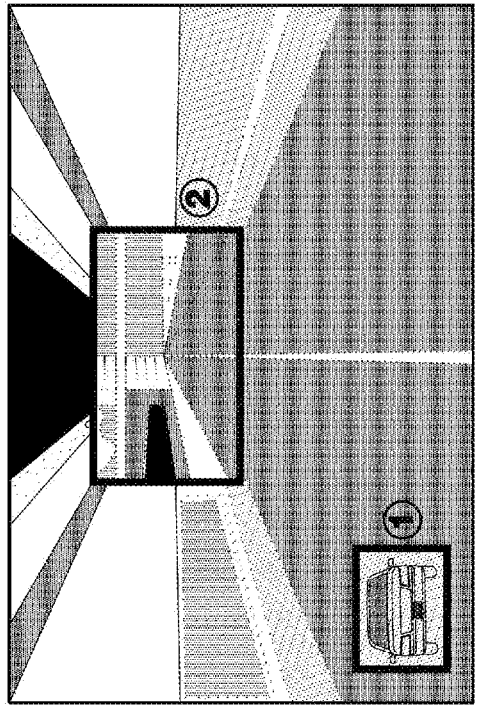
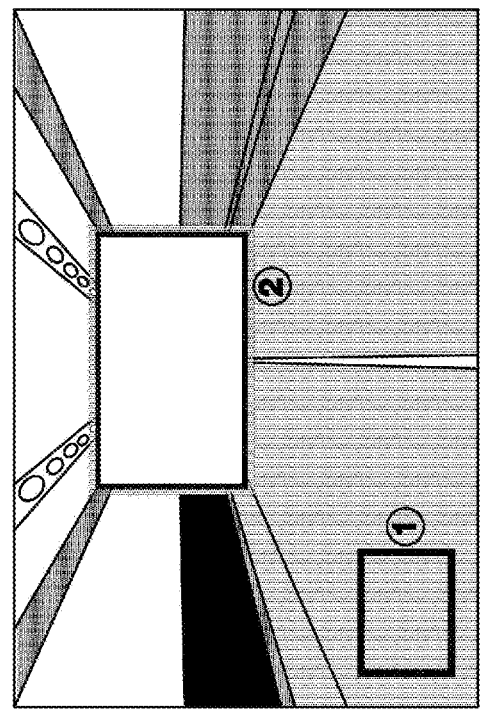
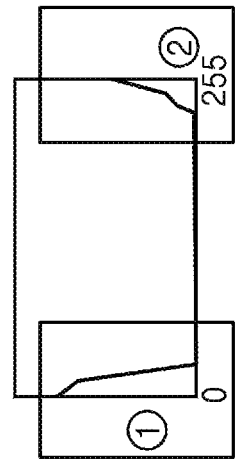
※ PRIORITY OF REGION ① > PRIORITY OF REGION ②

FIG. 16
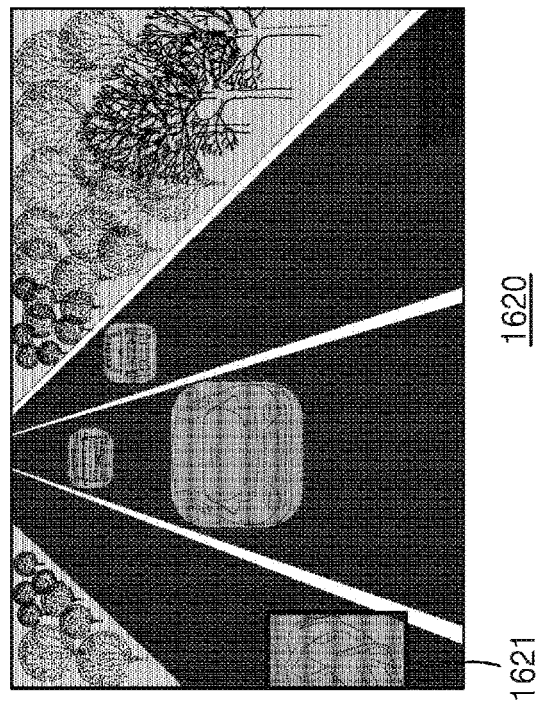
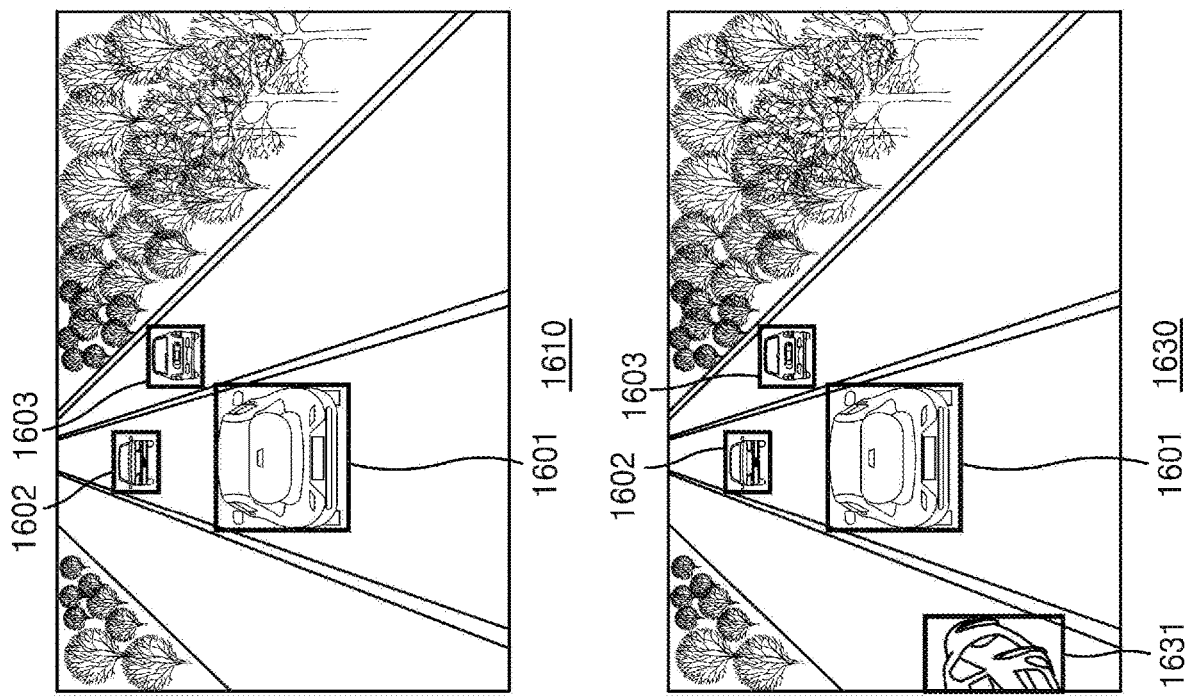

OBJECT RECOGNITION METHOD OF AUTONOMOUS DRIVING DEVICE, AND AUTONOMOUS DRIVING DEVICE

TECHNICAL FIELD

The present disclosure relates to a method of recognizing a neighboring object during autonomous driving and an autonomous driving device using the method.

BACKGROUND ART

As interest in autonomous vehicles increases, technologies that enable autonomous driving is attracting attention. In order for a vehicle to move by itself without a driver's operation, (1) a technology for recognizing the external environment of the vehicle, (2) a technology for synthesizing recognized information, determining an operation such as acceleration, stop, and turning, and determining a driving route, and (3) a technology for controlling the movement of the vehicle by using the determined information are used. All these technologies have to be organically combined to accomplish autonomous driving, but the technology for recognizing the external environment of a vehicle is getting more and more important. This is because recognizing the external environment is the first element of autonomous driving, and fusion of electric, electronic, and information technologies is needed to recognize the external environment.

The technology for recognizing the external environment may be roughly classified into a sensor-based recognition technology and a connection-based recognition technology. Sensors mounted on a vehicle for autonomous driving include ultrasonic sensors, cameras, radars, and LIDAR sensors, and these sensors mounted on a vehicle, either alone or together with other sensors, recognize the external environment of the vehicle and the topography and provide information to a driver and the vehicle.

The connection-based recognition technology for autonomous driving include V2X and precision positioning. V2X refers to vehicle-to-everything, which includes vehicle-to-vehicle (V2V) for communicating between vehicles, vehicle-to-infrastructure (V2I) for communicating with infrastructure, and vehicle-to-pedestrian (V2P) for communicating with pedestrians. V2X may refer to a wireless communication technology that connects a traveling vehicle to surrounding vehicles, transportation infrastructure, and nearby pedestrians. Information such as positions, distances, and speeds of vehicles may be exchanged through an established communication network, and information such as surrounding traffic information and positions of pedestrians may be provided to the vehicle.

DESCRIPTION OF EMBODIMENTS

Solution to Problem

An embodiment relates to an object recognition method performed by an autonomous driving device, whereby a recognition rate of an external object is increased through use of a camera by adjusting photographic configuration information of the camera based on object information detected by a dynamic vision sensor.

According to an embodiment, a method, performed by an autonomous driving device, of recognizing an object includes: obtaining a first RGB image by using a camera arranged in the autonomous driving device; predicting at least one first region in which an object is unrecognizable in the first RGB image based on brightness information of the first RGB image; determining at least one second region in which an object exists from among the at least one first region based on object information obtained through a dynamic vision sensor (DVS) arranged in the autonomous driving device; obtaining an enhanced second RGB image by controlling photographic configuration information of the camera in relation to the at least one second region; and recognizing the object in the second RGB image.

According to an embodiment, an autonomous driving device includes: a camera; a dynamic vision sensor (DVS); and at least one processor, wherein the at least one processor is configured to: obtain a first RGB image by using the camera; predict at least one first region in which an object is unrecognizable in the first RGB image based on brightness information of the first RGB image; determine at least one second region in which an object exists from among the at least one first region based on object information obtained through the dynamic vision sensor; obtain an enhanced second RGB image by controlling photographing configuration information of the camera in relation to the at least one second region; and recognize the object in the second RGB image.

According to an embodiment, a computer program product may store therein a program for: obtaining a first RGB image by using a camera; predicting at least one first region in which an object is unrecognizable in the first RGB image based on brightness information of the first RGB image; determining at least one second region in which an object exists from among the at least one first region based on object information obtained through a dynamic vision sensor (DVS); obtaining an enhanced second RGB image by controlling photographing configuration information of the camera in relation to the at least one second region; and recognizing the object in the second RGB image.

BRIEF DESCRIPTION OF DRAWINGS

FIG. 3 is a diagram for explaining an object-unrecognizable region and a region of interest determined in an RGB image, according to an embodiment.

FIG. 10 is a diagram for explaining an operation performed by an autonomous driving device to obtain an enhanced RGB image, according to an embodiment.

FIG. 11 is a diagram for explaining an operation performed by an autonomous driving device to obtain an enhanced RGB image when entering a tunnel, according to an embodiment.

FIG. 14 is a diagram for explaining priorities of a plurality of regions of interest, according to an embodiment.

FIG. 16 is a diagram for explaining an operation performed by an autonomous driving device to recognize and track a new object detected by a dynamic vision sensor, by using a camera, according to an embodiment.

MODE OF DISCLOSURE

Figure 1:
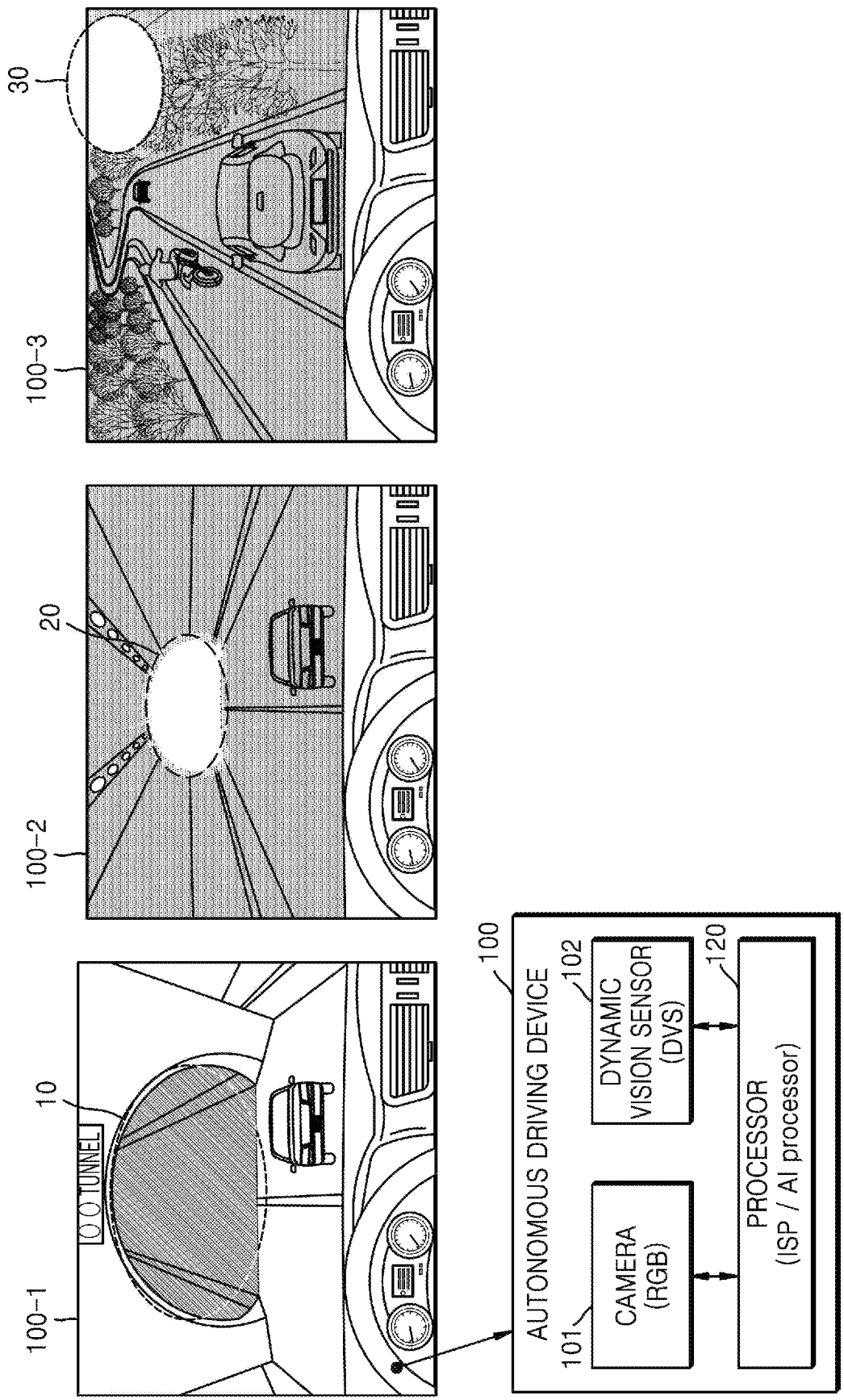
FIG. 1 is a diagram for explaining an autonomous driving device, according to an embodiment.

The terms used in the present specification will be briefly described and embodiments of the present disclosure will be described in detail.

The terms used in the present disclosure are selected from among terms that are currently widely used in consideration of their function in the present disclosure. However, the terms may be different according to an intention of one of ordinary skill in the art, a precedent, or the advent of new technology. Also, in particular cases, the terms are discretionally selected by the applicant of the present disclosure, in which case, the meaning of those terms will be described in detail in the corresponding part of the detailed description. Therefore, the terms used in the present disclosure are not merely designations of the terms, but the terms are defined based on the meaning of the terms and content throughout the present disclosure.

Throughout the specification, when a part "includes" an element, it is to be understood that the part additionally includes other elements rather than excluding other elements as long as there is no particular opposing recitation. Also, the terms described in the specification, such as " . . . er (or)", " . . . unit", " . . . module", etc., denote a unit that performs at least one function or operation, which may be implemented as hardware or software or a combination thereof.

Hereinafter, embodiments of the present disclosure will now be described in detail with reference to the accompanying drawings for one of skill in the art to be able to perform the present disclosure without any difficulty. The present disclosure may, however, be embodied in many different forms and should not be construed as being limited to the embodiments of the present disclosure set forth herein. Also, parts in the drawings unrelated to the detailed description are omitted to ensure clarity of the present disclosure, and like reference numerals in the drawings denote like elements.

FIG. 1 is a diagram for explaining an autonomous driving device, according to an embodiment.

The autonomous driving device 100 according to an embodiment may refer to a device capable of autonomous driving without depending on a control command input from the outside, and may include, for example, an autonomous driving vehicle, an autonomous flying device (e.g., a drone or an unmanned flying device), an autonomous driving robot (e.g., a cleaning robot or a disaster rescue robot), etc., but is not limited thereto. Hereinafter, for convenience of descriptions, a case where the autonomous driving device 100 is the autonomous driving vehicle will be described as an example.

According to an embodiment, the autonomous driving device 100 may include a camera 101, a dynamic vision sensor 102, and a processor 120, but is not limited thereto. For example, the autonomous driving device 100 may further include a lidar sensor, a radar sensor, an inertial sensor (inertial measurement unit (IMU)), an ultrasonic sensor, an infrared sensor, a position sensor (e.g., a global positioning system (GPS) module), a geomagnetic sensor, an acceleration sensor, a gyroscope sensor, etc. According to another embodiment, the autonomous driving device 100 may further include a communicator (e.g., a Bluetooth communicator, a Bluetooth low energy (BLE) communicator, a near-field communication (NFC) communicator, a Zigbee communicator, an ultra-wide band (UWB) communicator, and a mobile communicator), a driving unit (a power supply, a propelling unit, a traveling unit, and a peripheral device unit), an outputter, and a storage unit. The configuration of the autonomous driving device 100 will be described in detail with reference to FIG. 17.

The camera 101 according to an embodiment may recognize at least one object that is present within a certain distance from the autonomous driving device 100. Here, one or more cameras 101 for recognizing the object may be provided. For example, the camera 101 may be at least one of a front camera, a rear camera, and a side camera, and the camera 101 may be a stereo camera or an around-view camera.

Meanwhile, the object captured by the camera 101 may include a static environment element (e.g., a lane, a drivable road, a traffic sign, a traffic light, a tunnel, a bridge, a street tree, etc.) and a dynamic environment element (e.g., a vehicle, a pedestrian, a motorcycle, etc.), but is not limited thereto. For example, the object captured by the camera 101 may include features (e.g., a feature point and a feature line) that may be applied to a position recognition technology (e.g., simultaneous localization and mapping (SLAM) or visual inertial odometry (VIO)).

However, because a dynamic range of a typical camera 101 is not high, it is difficult for the camera 101 to capture an object in a very dark place or a very bright place. For example, when entering a tunnel (shown in 100-1), the camera 101 arranged in the autonomous driving device 100 may have difficulty in capturing an object in a dark region 10 in the tunnel. Also, when exiting the tunnel (shown in 100-2), the camera 101 arranged in the autonomous driving device 100 may have difficulty in capturing an object in a bright region 20 outside the tunnel, and may also have difficulty in capturing an object in a region 30 being brightly illuminated by a backlight (shown in 100-3). Furthermore, when the autonomous driving device 100 is passing a zone with extreme changes in illumination, or a shadowed zone, is moving at a high speed at night, or an object with a color similar to that of the background appears, it is difficult for the camera 101 to clearly capture the object.

Therefore, for safe driving of the autonomous driving device 100, it is necessary to increase an object recognition rate of the camera 101 in a low-illumination environment or in the presence of a backlight. For example, according to an embodiment, the autonomous driving device 100 may increase the object recognition rate of the camera 101 by controlling photographic configuration information of the camera 101 by using information detected by the dynamic vision sensor 102.

The dynamic vision sensor 102 is an event-based camera that captures a vision change at a high speed, and is a sensor that may obtain image data of a moving object. For example, the dynamic vision sensor 102 may transmit the image data to the processor 120 only when a local change due to a motion in a pixel unit occurs. That is, the dynamic vision sensor 102 may transmit the image data to the processor 120 when a motion event occurs.

The dynamic vision sensor 102 may solve a problem that a typical vision recognition system is vulnerable to a rapid motion. Because the dynamic vision sensor 102 receives data on a per-pixel basis rather than a frame basis, a blur phenomenon may be overcome.

In addition, the dynamic vision sensor 102 may have a resolution in microseconds. In other words, the dynamic vision sensor 102 may have a temporal resolution (e.g., a super high-speed frame>1K FPS) better than a super high-speed camera that shoots thousands of frames per second. In addition, the dynamic vision sensor 102 has dramatically reduced power consumption and data storage requirements, resulting in a dramatic increase in a dynamic range (a range of brightness identifiable by a sensor). Accordingly, the dynamic vision sensor 102 may detect the motion of the object when only a slight amount of light is present even in a dark place.

According to an embodiment, the dynamic vision sensor 102 may be close to the camera 101. In addition, a field of view (FOV) of the dynamic vision sensor 102 or a pose of the dynamic vision sensor 102 may be adjusted such that the dynamic vision sensor 102 obtain an image of a region similar to that of the image being captured by the camera 101. According to an embodiment, a frame rate of the dynamic vision sensor 102 may be set to be the same as or similar to that of the camera 101, but is not limited thereto.

According to an embodiment, while the autonomous driving device 100 is driving, the dynamic vision sensor 102 arranged in the autonomous driving device 100 may detect a local change in pixel units, and may transmit information about the detected local change to the processor 120. In this case, because the dynamic vision sensor 102 has a dynamic range wider than that of the camera 101, the processor 120 may receive information about an object, that is not captured by the camera 101, from the dynamic vision sensor 102. In this case, the processor 120 may control the photographic configuration information of the camera 101 such that the object, that is not captured by the camera 101 but is detected by the dynamic vision sensor 102, may be captured by the camera 101 as well. According to an embodiment, the processor 120 may include a general image signal processor (ISP) or an artificial intelligence processor (AI processor).

Hereinafter, a method, performed by the processor 120 of the autonomous driving device 100, of increasing the object recognition rate of the camera 101 by controlling the photographic configuration information of the camera 101, by using information detected by the dynamic vision sensor 102 will be described in detail with reference to FIG. 2.

Figure 2:
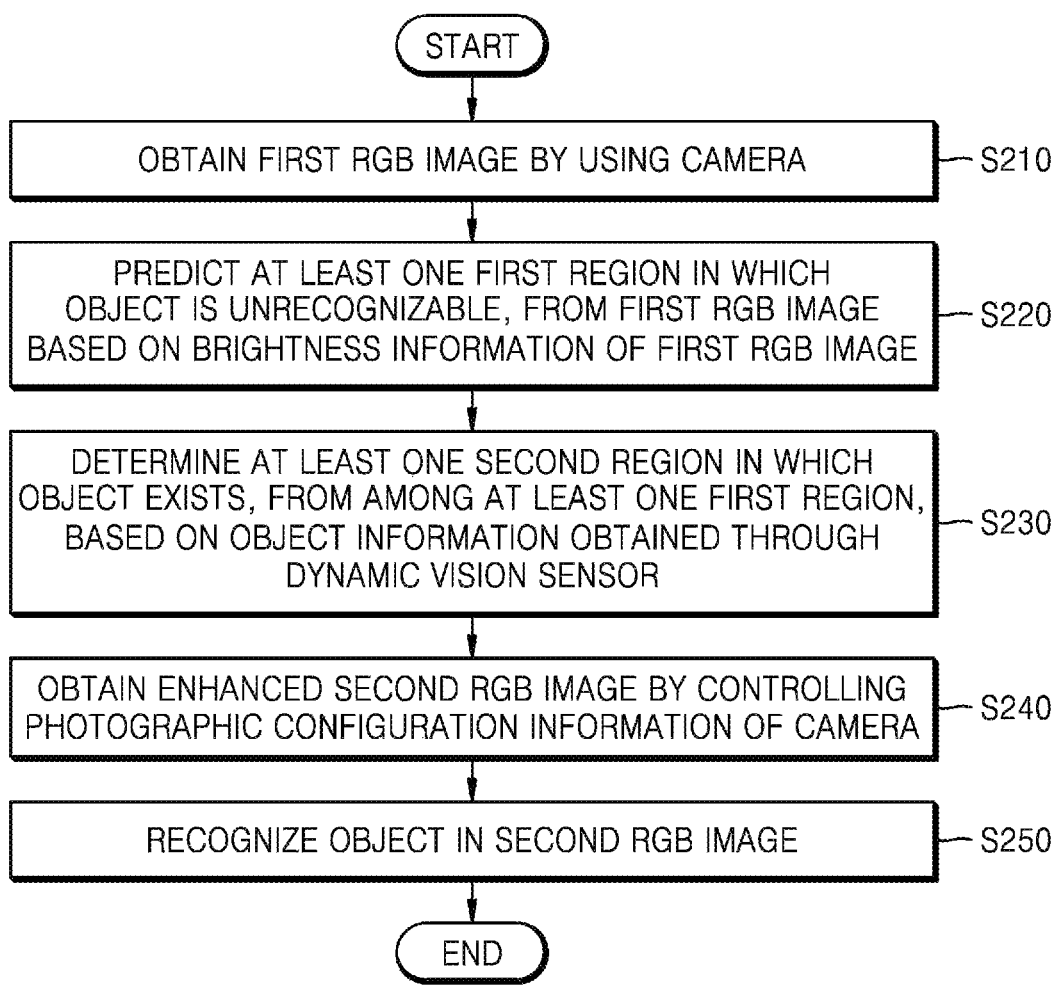
FIG. 2 is a flowchart for explaining an object recognition method used by an autonomous driving device, according to an embodiment.

FIG. 2 is a flowchart for explaining an object recognition method of an autonomous driving device, according to an embodiment.

In operation S210, the autonomous driving device 100 may obtain a first RGB image by using the camera 101.

According to an embodiment, the first RGB image is an image for recognizing at least one object around the autonomous driving device 100, and may be composed of at least one frame. For example, in a case of the first RGB image being a still image, the first RGB image may be composed of a single frame, while, in a case of the first RGB image being a moving image, the first RGB image may be composed of a plurality of frames.

According to an embodiment, the autonomous driving device 100 may obtain the first RGB image by using the camera 101 while driving, or may obtain the first RGB image by using the camera 101 after the autonomous driving device 100 is parked or stopped.

In operation S220, the autonomous driving device 100 may predict at least one first region in which an object is unrecognizable, from the first RGB image based on brightness information of the first RGB image. Here, the brightness information may be information indicating a brightness level of each pixel in the first RGB image. The brightness information may include a brightness value of each pixel, information about a region that is darker than a first reference brightness value, and information about a region that is brighter than a second reference brightness value, but is not limited thereto.

According to an embodiment, the autonomous driving device 100 may determine whether a probability that an object-unrecognizable region exists in the first RGB image exceeds a threshold value. The object-unrecognizable region may refer to a region in which the brightness values are out of a threshold range (e.g., 50 to 200) (e.g., a considerably dark or bright region). For example, the autonomous driving device 100 may determine the probability that the object-unrecognizable region exists in the first RGB image by using a histogram of the first RGB image. In a case where the distribution of the histogram of the first RGB image is biased to 0 or 255, the autonomous driving device 100 may determine that the probability that the object-unrecognizable region exists in the first RGB image is high. An operation of, by the autonomous driving device 100, using the histogram will be described in detail with reference to FIG. 5.

According to an embodiment, the autonomous driving device 100 may determine the probability that the object-unrecognizable region exists in the first RGB image, based on a difference between the first RGB image and a dynamic vision sensor (DVS) image obtained through the dynamic vision sensor 102. For example, the greater a difference between edge information (or intensity information) detected from the DVS image and edge information (or intensity information) detected from the first RGB image is, the higher the probability that the object-unrecognizable region exists in the first RGB image the autonomous driving device 100 may determine.

According to an embodiment, the autonomous driving device 100 may determine the probability that the object-unrecognizable region exists in the first RGB image by using an artificial intelligence model that has been trained based on a plurality of RGB images. An operation of, by the autonomous driving device 100, using the artificial intelligence model will be described in detail with reference to FIG. 8.

In a case where the autonomous driving device 100 has determined that the probability that the object-unrecognizable region exists in the first RGB image is greater than the threshold value, the autonomous driving device 100 may predict the at least one first region in which an object is unrecognizable, from the first RGB image, by using the brightness information of the first RGB image. Here, the at least one first region in which an object is unrecognizable may be a region in which a degree indicating how likely an object is unrecognizable exceeds a threshold value. For example, the autonomous driving device 100 may define, as the at least one first region in which an object is unrecognizable, a region in which the brightness values are out of the threshold range in the first RGB image (e.g., a considerably dark or bright region). Accordingly, only a few features may be detected in the at least one first region in which an object is unrecognizable. Hereinafter, for convenience of description, the at least one first region in which an object is unrecognizable may be expressed as the object-unrecognizable region.

In operation S230, the autonomous driving device 100 may determine at least one second region in which an object exists, from among the at least one first region, based on object information obtained through the dynamic vision sensor 102 arranged in the autonomous driving device 100. Hereinafter, for convenience of description, the at least one second region may be expressed as a region of interest.

According to an embodiment, the autonomous driving device 100 may obtain the object information through the dynamic vision sensor 102. The object information is information about the object detected by the dynamic vision sensor 102, and may include at least one of the DVS image and position information of at least one object detected from the DVS image, but is not limited thereto.

According to an embodiment, the autonomous driving device 100 may compare the DVS image with the first RGB image to define, as the region of interest, a region, from among the at least one first region of the first RGB image, in which a probability that an object exists is greater than the threshold value (e.g., 98%). For example, the region of interest may be a region, the DVS image of which has a large amount of feature information, while the first RGB image of which has a small amount of feature information.

The object-unrecognizable region and the region of interest will be described with reference to FIG. 3. Referring to 300-1 of FIG. 3, the autonomous driving device 100 may obtain an RGB image 310 while passing through the tunnel. In this case, on the RGB image 310, a tunnel exit region may appear bright while a region inside the tunnel may appear dark. The autonomous driving device 100 may analyze the RGB image 310 by using the histogram of the RGB image 310 or by using the artificial intelligence model. As a result of the analysis, the autonomous driving device 100 may define regions 311, 312, 313, 314, 315 (tunnel exit region), 316 and 317, in which the brightness values are out of the threshold range, as the object-unrecognizable regions. In this case, the regions 311, 312, 313, 316, and 317 may be the regions inside the tunnel and are considerably dark, while the regions 314 and 315 may be regions that are considerably bright due to light incident from an exit of the tunnel.

Referring to 300-2 of FIG. 3, the autonomous driving device 100 may compare the regions 311 to 317 of the RGB image 310 with corresponding regions of the DVS image 320, respectively. Here, as the tunnel exit region 315 is bright, an object may not be captured in the RGB image 310, whereas the object may be detected in a corresponding region 321 of the DVS image. Because the dynamic vision sensor 102 has a dynamic range wider than that of the camera 101, the dynamic vision sensor 102 may detect an object in a bright region.

Accordingly, the autonomous driving device 100 may define, as the region of interest, a region in which an object is detected by the dynamic vision sensor 102 (e.g., the tunnel exit region 315), but in which the object is not captured by the camera 101.

In operation S240, the autonomous driving device 100 may obtain an enhanced second RGB image corresponding to the at least one second region (for convenience of description, referred to as the region of interest), by controlling the photographic configuration information of the camera 101. Here, the photographic configuration information of the camera 101 may include exposure information, focus information, white balance information, or mode information, but is not limited thereto. Also, the enhanced second RGB image may refer to an image having a brightness adjusted to enable object detection in a region corresponding to the second region of the first RGB image.

According to an embodiment, the autonomous driving device 100 may check the current photographic configuration information of the camera 101 and control the photographic configuration information such that the brightness of the region of interest may be adjusted. For example, the autonomous driving device 100 may control at least one of exposure, focus, and white balance with respect to the region of interest. In particular, the autonomous driving device 100 may control an exposure value with respect to the region of interest by adjusting at least one of a gain, aperture, and exposure time of the camera 101. For example, in a case where the region of interest is a dark region, the autonomous driving device 100 may appropriately adjust the gain, the aperture, and the exposure time to control the region of interest to appear brighter in the enhanced second RGB image. In contrast, in a case where the region of interest is a bright region, the autonomous driving device 100 may appropriately adjust the gain, the aperture, and the exposure time to control the region of interest to appear darker in the enhanced second RGB image.

Figure 4:
FIG. 4 is a diagram for explaining photographic configuration information of a camera, according to an embodiment.

Referring to FIG. 4, the aperture 410 refers to a hole of a lens through which light passes. As the aperture 410 is closed (right) to increase a depth, an image where a near region and a far region are focused is output, whereas, as the aperture 410 is opened (left) to reduce the depth, an image where a subject and a background are separated from each other, referred to as out of focus, is output. As a shutter speed 420 increases (left), an image where a fast moving object appears frozen is output, whereas, as the shutter speed 420 decreases (right), a blurred image is output. As an ISO sensitivity 430 decreases (left), an image with small noise is output. As the ISO sensitivity 430 increases (right), noise increases and an image with no shake may be taken even in a dark environment.

As the ISO sensitivity 430 decreases (left), a contrast increases. In contrast, as the ISO sensitivity 430 increases, the contrast is reduced, and thus a blunt image is taken. In a case of the ISO sensitivity 430 being low, film grains are thin and lead to a sharp image, whereas, in a case of the ISO sensitivity 430 being high, the film grains are thick and lead to a rough image.

Therefore, according to an embodiment, in a case where the region of interest is dark, the autonomous driving device

100 may increase the sensitivity 430 of the camera 101 or may control the shutter speed 420 to be decreased. In contrast, in a case where the region of interest is bright, the autonomous driving device 100 may decrease the sensitivity 430 of the camera 101.

Meanwhile, according to an embodiment, in a case of the region of interest being brightly illuminated by a backlight, the autonomous driving device 100 may change a metering mode, for example, to any one of evaluative metering, partial metering, center-weighted average metering, or spot metering, or may change an autofocus point (AF point). For example, in a case of the region of interest being a bright region, the autonomous driving device 100 may obtain the second RGB image which is entirely dark by moving the AF point to the region of interest.

In addition, according to an embodiment, the autonomous driving device 100 may select a wide dynamic range (WDR) function. The wide dynamic range (WDR) is a technology for enabling both bright regions and dark regions of an image to clearly appear. By this technology, a high-speed shutter image signal for the bright region and a low-speed shutter image signal for the dark region are merged into an image, and thus a problem due to a backlight may be resolved to generate a clear image.

According to an embodiment, the AI processor of the autonomous driving device 100 may control the photographic configuration information of the camera 101 by using the artificial intelligence model that has trained to control the photographic configuration information. An operation of, by the autonomous driving device 100, controlling the photographic configuration information of the camera 101 by using the artificial intelligence model will be described in detail with reference to FIG. 8.

In operation S250, the autonomous driving device 100 may recognize the object in the second RGB image.

According to an embodiment, the autonomous driving device 100 may extract at least one feature that constitutes the object, from a region of interest of the second RGB image. The region of interest of the second RGB image may correspond to the region of interest of the first RGB image. The autonomous driving device 100 may recognize the object in the region of interest of the second RGB image by using the at least one extracted feature. According to an embodiment, the recognizing of the object may include determining a type of the object.

According to an embodiment, the autonomous driving device 100 may recognize the object in the region of interest of the second RGB image that corresponds to the region of interest of the first RGB image, by using template information or the artificial intelligence model. For example, the autonomous driving device 100 may determine the type of the object by analyzing the second RGB image obtained through the camera 101. For example, in a case of the object being an external vehicle, the autonomous driving device 100 may detect an outline of the external vehicle included in the second RGB image, as the feature. The autonomous driving device 100 may compare the detected outline of the external vehicle with a predefined template to detect a type of the external vehicle, a name of the external vehicle, etc. For example, in a case of the outline of the external vehicle being similar to a template of a bus, the autonomous driving device 100 may recognize the external vehicle as a bus. In addition, because a typical bus is large and heavy, the autonomous driving device 100 may define the type of the external vehicle as a large vehicle.

According to an embodiment, the autonomous driving device 100 may recognize the object in the region of interest of the second RGB image by using a precision map. Here, the precision map may include not only road information necessary for the vehicle to travel but also a map which is much more precise than an existing map and has an error of, for example, 10-20 cm or less from an actual road. For example, the autonomous driving device 100 may call a precision map of surroundings of the autonomous driving device 100. The autonomous driving device 100 may compare the second RGB image with the called precision map to recognize a static object in the region of interest of the second RGB image. For example, the autonomous driving device 100 may recognize that the object is a lane, a stop line, a road sign, a road structure, etc., by comparing the features extracted from the second RGB image with the precision map.

Meanwhile, the autonomous driving device 100 may identify a current position of the recognized object (e.g., absolute position), a lane in which the external vehicle is driving (e.g., first lane) in a case of the recognized object being the external vehicle, etc., by using the precision map.

According to an embodiment, in a case of the recognized object being a dynamic object (e.g., an external vehicle), the autonomous driving device 100 may track the recognized object by using the camera 101. Object tracking refers to tracking changes in an object by using similarities between characteristic information such as sizes, colors, shapes, or contours of the same objects in a series of image frames.

According to an embodiment, the dynamic vision sensor 102 may detect a new object appearing around the autonomous driving device 100 earlier than the camera 101 does. Therefore, according to an embodiment, in a case where the new object has been detected by the dynamic vision sensor 102, the autonomous driving device 100 may determine, based on a position where the new object is detected, a candidate region in which a possibility of recognizing the new object on the RGB image of the camera 101 is greater than a threshold value. The autonomous driving device 100 may recognize and track the new object on the RGB image, by performing image processing on the candidate region. In this case, the autonomous driving device 100 may rapidly recognize the new object by performing the image processing on only the candidate region, rather than on the entirety of the RGB image, in order to capture the new object by using the camera 101. An operation of, by the autonomous driving device 100, recognizing and tracking the object will be described in detail with reference to FIG. 15.

According to an embodiment, in a case of the second RGB image being composed of a plurality of frames, the autonomous driving device 100 may obtain position information of the autonomous driving device 100 by tracking a feature included in the object recognized from each of the plurality of frames. For example, the autonomous driving device 100 may use the feature included in the object recognized from the second RGB image, as a feature to be applied to visual odometry (e.g., visual odometry using VIO or a stereo camera). Here, the visual odometry is a technology for predicting a position change of a mobile device by using a difference between a previous frame and a current frame.

According to an embodiment, because calculation of changes in the previous frame and the current frame with respect to all pixels requires a considerably high amount of calculation, the autonomous driving device 100 may extract features such as lines or corners that may represent a change in a scene from each frame and may match the extracted features.

According to an embodiment, the autonomous driving device 100 may generate a motion vector from which a change in a position of a feature point on the scene may be predicted, by matching the feature point extracted from the previous frame, in the current frame. Because the motion vector represents an image change in a two-dimensional space (x, y), the autonomous driving device 100 may convert the motion vector into coordinates in a three-dimensional space (x, y, z) by adding distance information (depth) from the stereo camera or distance information from the inertial sensor (IMU). The autonomous driving device 100 may calculate a three-dimensional motion vector that represents an amount of changes in an actual space by using three-dimensional coordinates corresponding to the feature point in the previous frame and three-dimensional coordinates corresponding to the feature point in the current frame, from a set of the matched feature points. The autonomous driving device 100 may recognize a current position of the autonomous driving device 100 by using the three-dimensional motion vector.

In an outdoor environment, because textures of roads may be neither uniform nor flat, it is difficult to use position recognition using an encoder, and, in a case of a global positioning system (GPS), signals may not be received when surrounded by an artificial structure such as a tunnel or a building, and it is difficult to use an inertial navigation system (INS) with six degrees of freedom because of its considerably expensive price. Therefore, according to an embodiment, a position of the autonomous driving device 100 may be recognized by using the feature extracted from the second RGB image, and thus disadvantages of the GPS and the INS may be mitigated.

According to an embodiment, the autonomous driving device 100 may generate a map based on position information recognized through the visual odometry.

According to an embodiment, the autonomous driving device 100 may determine a route of the autonomous driving device 100 based on information about the object recognized from the second RGB image. For example, in a case where the object recognized from the second RGB image is an obstacle, the autonomous driving device 100 may plan a motion for avoiding the obstacle. For example, the autonomous driving device 100 may change a lane or decrease its speed. In addition, in a case where the object recognized from the second RGB image is a traffic light indicating a stop sign, the autonomous driving device 100 may plan the route for stopping in front of a stop line.

Therefore, according to an embodiment, the autonomous driving device 100 may increase the object recognition rate of the camera 101 even in an environment with extreme changes in illumination, by controlling the photographic configuration information of the camera 101 based on the information detected by the dynamic vision sensor 102. In addition, as the object recognition rate of the camera 101 is increased, a current position recognition rate, precision in planning the route, and an object tracking rate may be improved.

Hereinafter, an operation of, by the autonomous driving device 100, using the histogram will be described in detail with reference to FIG. 5.

Figure 5:
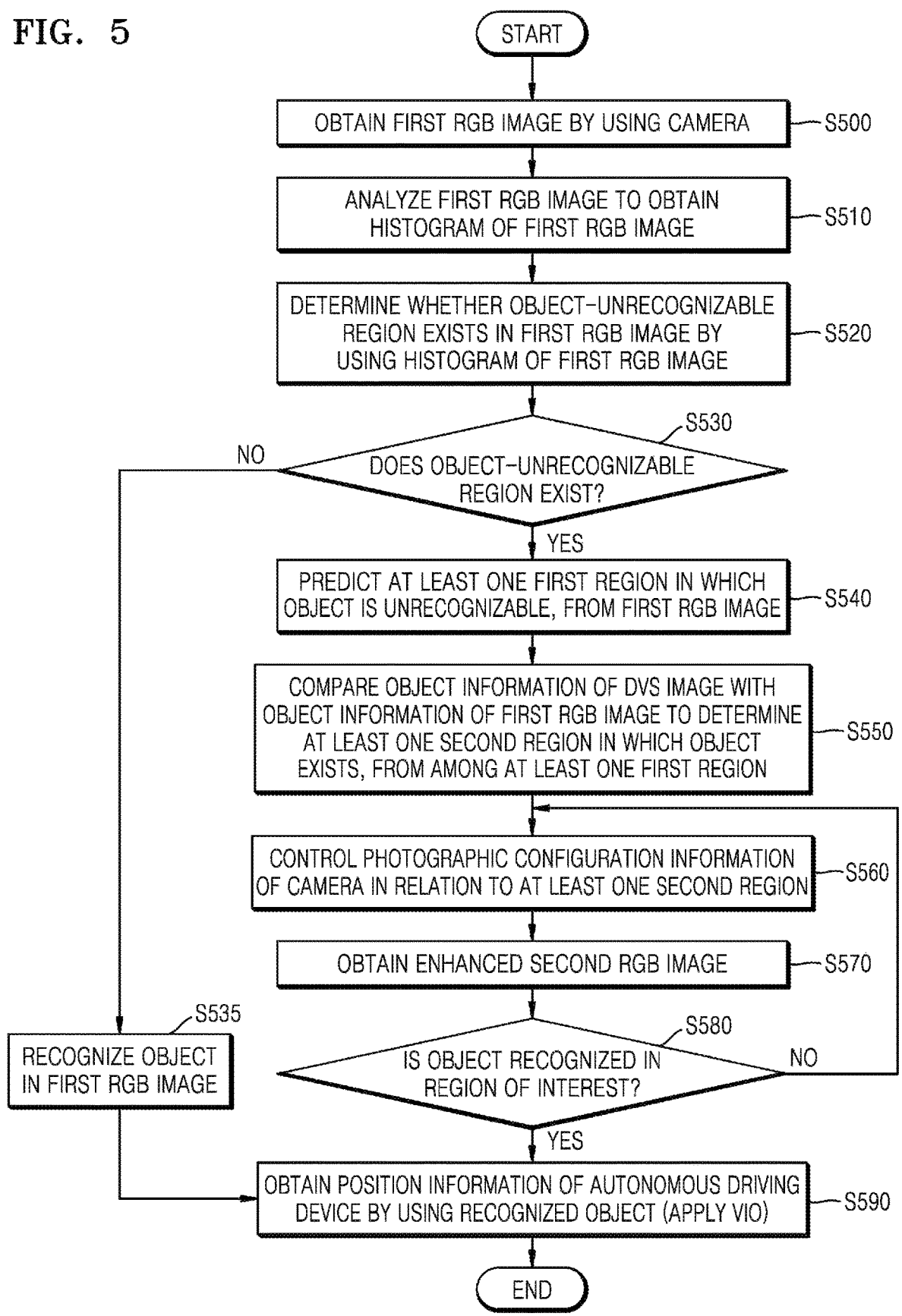
FIG. 5 is a flowchart for explaining a method of recognizing an object by using a histogram, according to an embodiment.

FIG. 5 is a flowchart for explaining a method of recognizing an object by using a histogram, according to an embodiment.

In operation S500, the autonomous driving device 100 may obtain the first RGB image by using the camera 101.

Operation S500 corresponds to operation S210 of FIG. 2, and accordingly, its detailed description will be omitted.

In operation S510, the autonomous driving device 100 may analyze the first RGB image to obtain the histogram of the first RGB image. The histogram represents a brightness distribution of an image in a graph. For example, the histogram may have a range of brightness values of 0 to 255, and frequencies (the number of pixels) of each brightness value may be represented as heights of rectangles. That is, a horizontal axis of the histogram may represent the brightness values, and a vertical axis of the histogram may represent numbers of pixels. Accordingly, in a case of the first RGB image being generally dark, a histogram having a distribution biased to 0 may be obtained, while, in a case of the first RGB image being generally bright, a histogram having a distribution biased to 255 may be obtained.

In operation S520, the autonomous driving device 100 may determine whether the object-unrecognizable region exists in the first RGB image by using the histogram of the first RGB image.

According to an embodiment, the autonomous driving device 100 may determine that the object-unrecognizable region exists in a case where the distribution of the histogram is not uniform and biased leftward or rightward.

Figure 6:
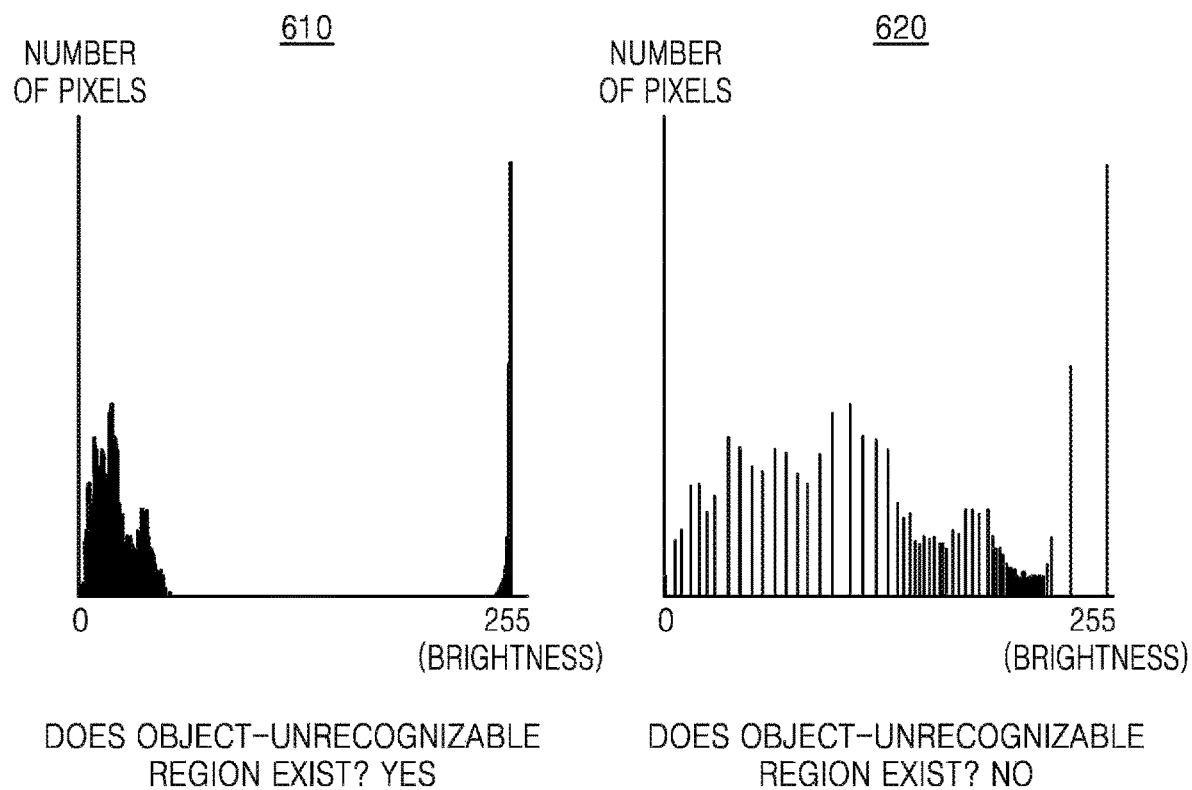
FIG. 6 is a diagram for explaining an operation of determining whether an object-unrecognizable region exists in an RGB image by using a histogram, according to an embodiment.

For example, referring to FIG. 6, a brightness distribution of a first histogram 610 is not uniform, and biased leftward and rightward. In this case, the autonomous driving device 100 may determine that the probability that the object-unrecognizable region exists in the first RGB image is high because the first RGB image may be composed of mostly bright regions and dark regions. On the other hand, a brightness distribution of a second histogram 620 is uniform, from 0 to 255, the autonomous driving device 100 may determine that the probability that the object-unrecognizable region exists in the first RGB image is low.

In operation S530, in a case where the autonomous driving device 100 has determined that the object-unrecognizable region does not exist, the autonomous driving device 100 may not modify the photographic configuration information of the camera 101. That is, the autonomous driving device 100 may continuously obtain RGB images based on the current photographic configuration information of the camera 101. In operation S535, because the object-unrecognizable region does not exist in the first RGB image, the autonomous driving device 100 may recognize the object from the first RGB image.

In operation S540, in a case where the autonomous driving device 100 has determined that the object-unrecognizable region exists, the autonomous driving device 100 may predict the at least one first region (object-unrecognizable region) in which an object is unrecognizable, from the first RGB image. Here, the at least one first region in which an object is unrecognizable may be a region(s) in which the brightness values are out of the threshold range.

When the first RGB image is converted into the histogram, all spatial information of the first RGB image is lost. That is, the histogram indicates the number of pixels having each brightness value, but does not provide any information about where the pixels are located. Therefore, the autonomous driving device 100 may determine a threshold value by using the histogram, in order to identify the object-unrecognizable region in the first RGB image. For example, the autonomous driving device 100 may analyze the histogram to determine a first reference value for detecting a region in which an object is unrecognizable due to the region's darkness, or a second reference value for detecting a region in which an object is unrecognizable due to the region's brightness.

Figure 7:
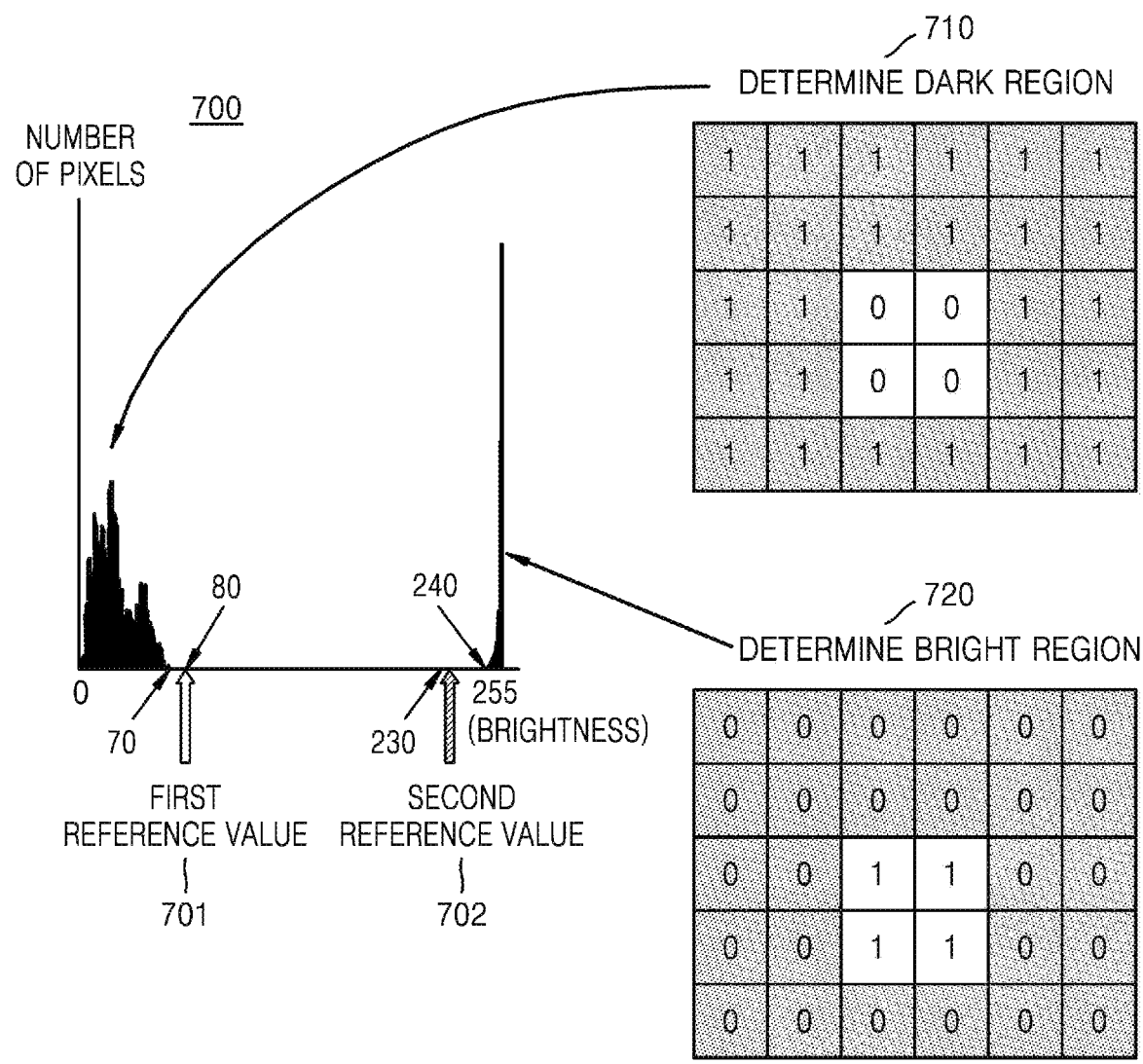
FIG. 7 is a diagram for explaining an operation of determining an object-unrecognizable region in an RGB image, according to an embodiment.

For example, referring to FIG. 7, the histogram 700 of the first RGB image may be divided into a group of pixels having brightness values between 0 and 70 and another group of pixels having brightness values between 240 and 250. Therefore, the autonomous driving device 100 may define the first reference value 701 as '80', for detecting the dark region 710 in which an object is unrecognizable due to the region's darkness. In this case, the autonomous driving device 100 may define the dark region 710 in which an object is unrecognizable due to the region's darkness by representing a pixel having a brightness value less than 80 as '1' and representing a pixel having a brightness value greater than or equal to 80 as '0'. In addition, the autonomous driving device 100 may define the second reference value 702 as '230', for detecting the bright region 720 in which an object is unrecognizable due to the region's brightness. In this case, the autonomous driving device 100 may define the bright region 720 in which an object is unrecognizable due to the region's brightness by representing a pixel having a brightness value greater than 230 as '1' and representing a pixel having a brightness value less than or equal to 230 as '0'.

Although FIG. 7 illustrates a case where the first reference value 701 is different from the second reference value 702, the present disclosure is not limited thereto. According to an embodiment, the first reference value 701 and the second reference value 702 may be the same value. For example, the autonomous driving device 100 may define both the first reference value 701 and the second reference value 702 as '150'. In this case, the autonomous driving device 100 may define the dark region 710 by representing a pixel having a brightness value less than 150 as '1', and may define the bright region 720 by representing a pixel having a brightness value greater than 150 as '1'.

In operation S550, the autonomous driving device 100 may compare the object information of the DVS image obtained through the dynamic vision sensor 102 with the object information of the first RGB image, to determine the at least one second region (region of interest) in which an object exists, from among the at least one first region.

For example, the autonomous driving device 100 may define, as the region of interest, a region, the DVS image of which has a large amount of feature information, while the first RGB image of which has a small amount of feature information.

Operation S550 corresponds to operation S230 of FIG. 2, and accordingly, its detailed description will be omitted.

In operation S560, the autonomous driving device 100 may control the photographic configuration information of the camera 101 in relation to the at least one second region (region of interest). In operation S570, the autonomous driving device 100 may obtain the enhanced second RGB image from the camera 101 based on the modified photographic configuration information.

According to an embodiment, the autonomous driving device 100 may check the current photographic configuration information of the camera 101 and control the photographic configuration information such that the brightness of the region of interest may be modified. For example, the autonomous driving device 100 may control at least one of exposure, focus, and white balance with respect to the region of interest. In particular, the autonomous driving device 100 may control the exposure value with respect to the region of interest by adjusting at least one of the gain, aperture, and exposure time of the camera 101. For example, in a case where the region of interest is a dark region, the autonomous driving device 100 may appropriately adjust the gain, the aperture, and the exposure time to control the region of interest to appear brighter in the enhanced second RGB image. In contrast, in a case where the region of interest is a bright region, the autonomous driving device 100 may appropriately adjust the gain, the aperture, and the exposure time to control the region of interest to appear darker in the enhanced second RGB image.

Operations S560 and S570 correspond to operation S240 of FIG. 2, their detailed description will be omitted.

In operation S580, in a case where no object has not been recognized from the region of interest (a region(s) corresponding to the at least one second region of the first RGB image) of the second RGB image, the autonomous driving device 100 may control the photographic configuration information of the camera 101 in relation to the at least one second region (region of interest) again. For example, in a case of the region of interest being a dark region, the autonomous driving device 100 may further increase the gain of the camera 101 to capture the region of interest appearing brighter.

In operation S590, the autonomous driving device 100 may obtain the position information of the autonomous driving device 100 by using a recognized object.

According to an embodiment, the autonomous driving device 100 may use a feature included in the recognized object as a feature to be applied to a VIO technology. For example, the autonomous driving device 100 may extract the features from the region of interest of the current frame and the region of interest of the previous frame of the second RGB image, respectively, and may predict a change in the position in a two-dimensional space by matching the extracted features. The autonomous driving device 100 may obtain information of an actual travel distance by using the stereo camera or the inertial sensor. The autonomous driving device 100 may estimate an amount of three-dimensional position changes by using the predicted position change and the distance information obtained through the stereo camera or the inertial sensor. The autonomous driving device 100 may generate a three-dimensional map of surroundings of the autonomous driving device 100 by using the amount of the three-dimensional position changes.

Hereinafter, an operation of, by the autonomous driving device 100, using the artificial intelligence model instead of the histogram will be described in detail with reference to FIG. 8.

Figure 8:
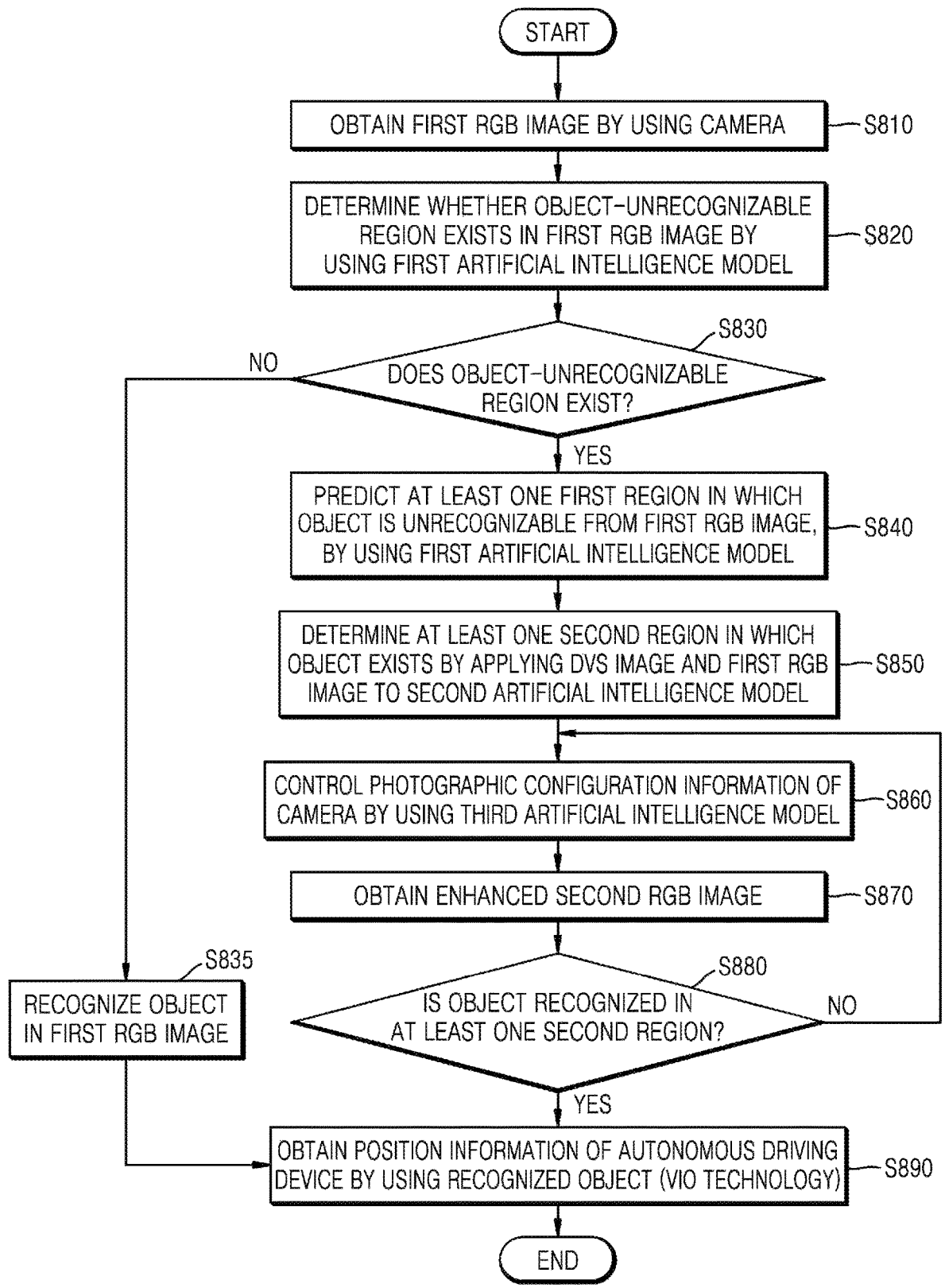
FIG. 8 is a flowchart for explaining a method of recognizing an object by using an artificial intelligence model, according to an embodiment.

FIG. 8 is a flowchart for explaining a method of recognizing an object by using an artificial intelligence model, according to an embodiment.

In operation S810, the autonomous driving device 100 may obtain the first RGB image by using the camera 101.

Operation S810 corresponds to operation S210 of FIG. 2, and accordingly, its detailed description will be omitted.

In operation S820, the autonomous driving device 100 may determine whether the object-unrecognizable region exists in the first RGB image by using a first artificial intelligence model. According to an embodiment, the first artificial intelligence model is a neural network model that learns from RGB images, and may be a model that has been trained to determine an object-unrecognizable region in RGB images. According to an embodiment, the first artificial intelligence model may be trained based on RGB images captured on a route through which the autonomous driving device 100 frequently travels.

According to an embodiment, when the first RGB image is input, the first artificial intelligence model may identify dark regions and bright regions in the first RGB image. In this case, the first artificial intelligence model may determine whether the object-unrecognizable region exists in the first RGB image by considering distributions of the dark regions and the bright regions. For example, in a case where the first RGB image has an irregular brightness distribution and is considerably dark or bright, the first artificial intelligence model may determine that the object-unrecognizable region exists in the first RGB image.

In addition, according to an embodiment, in a case of surrounding situation information (context information) being received, the first artificial intelligence model may determine whether the object-unrecognizable region exists in the first RGB image by considering the surrounding situation information. For example, when the autonomous driving device 100 is entering or passing through a tunnel, the first artificial intelligence model may determine that the probability that the object-unrecognizable region exists in the first RGB image is high. In addition, when the current position of the autonomous driving device 100 on a current driving route is where a backlight occurs, the first artificial intelligence model may determine that the probability that the object-unrecognizable region exists in the first RGB image is high.

In operation S830, in a case where it has been determined that the object-unrecognizable region does not exist, the autonomous driving device 100 may not modify the photographic configuration information of the camera 101. That is, the autonomous driving device 100 may continuously obtain RGB images based on the current photographic configuration information of the camera 101. In operation S835, because the object-unrecognizable region does not exist in the first RGB image, the autonomous driving device 100 may recognize the object from the first RGB image.

In operation S840, in a case where it has been determined that the object-unrecognizable region exists, the at least one first region in which an object is unrecognizable (object-unrecognizable region) may be predicted from the first RGB image, by using the first artificial intelligence model.

For example, in a case where the autonomous driving device 100 applies the first RGB image to the first artificial intelligence model, the first artificial intelligence model may define, as the object-unrecognizable region, a region having brightness values lower than the first reference value (e.g., 100) or a region having brightness values higher than the second reference value (e.g., 150) in the first RGB image.

In operation S850, the autonomous driving device 100 may determine the at least one second region in which an object exists, from among the at least one first region, by applying the DVS image and the first RGB image to a second artificial intelligence model.

According to an embodiment, the second artificial intelligence model may be a model that learns from DVS images and RGB images with respect to the same scene. The second artificial intelligence model may be a neural network model that compares a DVS image with an RGB image, and predicts a region where an object exists, from among object-unrecognizable regions of the RGB image.

According to an embodiment, the second artificial intelligence model may be separated from or integrated with the first artificial intelligence model for determining the object-unrecognizable region in the RGB image.

Figure 9:
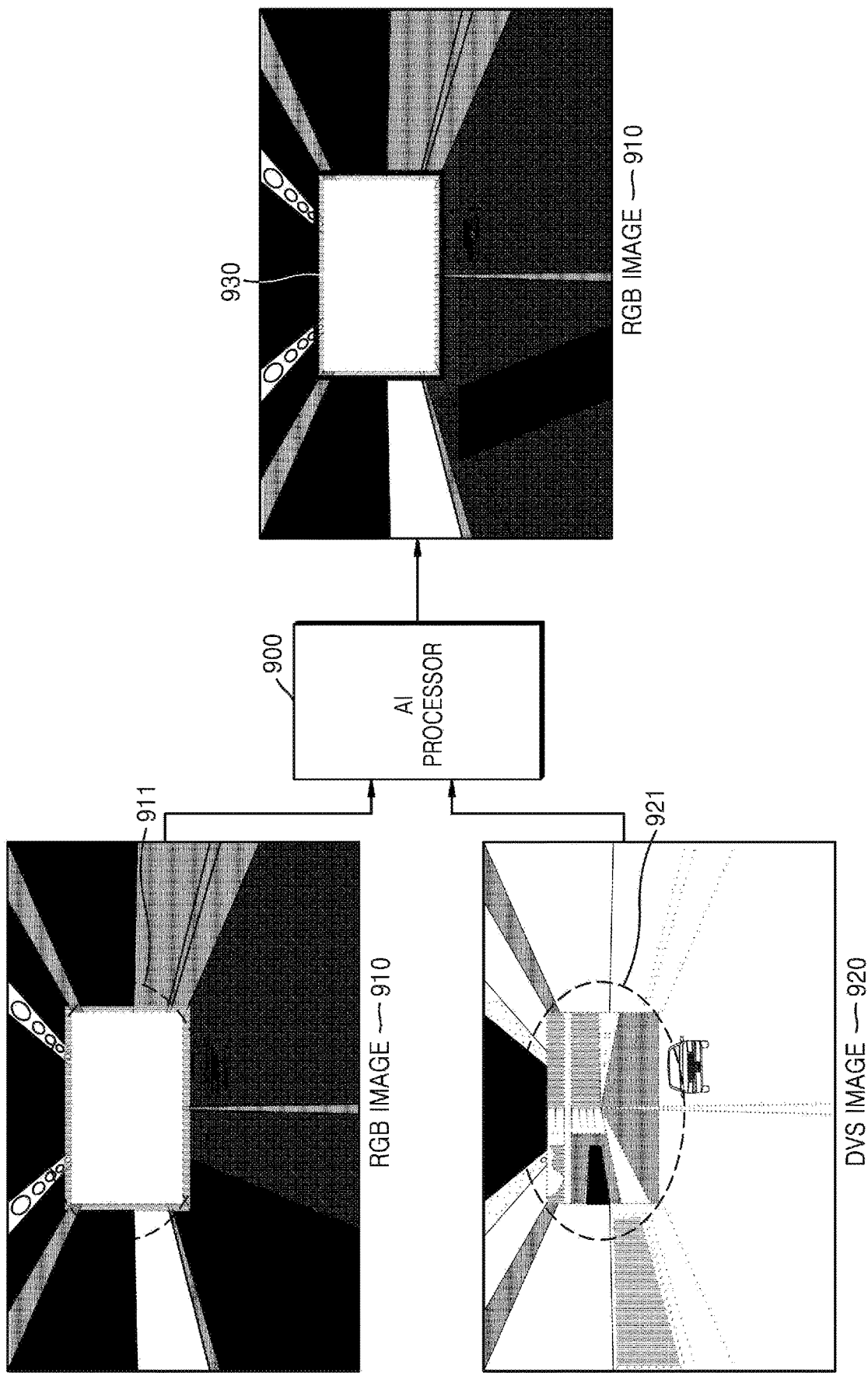
FIG. 9 is a diagram for explaining an operation of applying an RGB image and a DVS image to an AI processor, according to an embodiment.

Referring to FIG. 9, the autonomous driving device 100 may obtain the RGB image 910 through the camera 101 while passing through a tunnel, and may obtain the DVS image 920 through the dynamic vision sensor 102. The RGB image 910 and the DVS image 920 may be transmitted to the AI processor 900. The AI processor 900 may input the RGB image 910 and the DVS image 920 to the second artificial intelligence model. In this case, the second artificial intelligence model may compare the RGB image 910 with the DVS image 920 and determine that only a few features or edges are detected from the tunnel exit region 911 in the RGB image 910 while a lot of features or edges are detected from the tunnel exit region 921 in the DVS image 920. In this case, the second artificial intelligence model may define the tunnel exit region 911 of the RGB image 910, as the region of interest 930 where an object exists but is not recognized. The second artificial intelligence model may communicate information about the region of interest 930 to the AI processor 900.

In operation S860, the autonomous driving device 100 may control the photographic configuration information of the camera 101 by using a third artificial intelligence model. In operation S870, the autonomous driving device 100 may obtain the enhanced second RGB image based on the changed photographic configuration information.

According to an embodiment, the third artificial intelligence model may be a neural network model that learns from RGB images and the photographic configuration information (e.g., exposure, white balance, focus) of the camera 101. The third artificial intelligence model may be for recommending appropriate photographic configuration information. The third artificial intelligence model may be separated from the first artificial intelligence model and the second artificial intelligence model. Alternatively, the third artificial intelligence model may be integrated with the first artificial intelligence model and the second artificial intelligence model, to constitute a single model.

Referring to FIG. 10, the autonomous driving device 100 may apply information about the RGB image 910 and the region of interest 930 to the third artificial intelligence model. In this case, the third artificial intelligence model may determine a photographic configuration value for changing the brightness of the region of interest 930 of the RGB image 910. According to an embodiment, the third artificial intelligence model may modify at least one of exposure, focus, and white balance with respect to the region of interest 930. In particular, the third artificial intelligence model may control an exposure value with respect to the region of interest 930 by adjusting at least one of the gain, aperture, and exposure time of the camera 101. For example, because the region of interest 930 is a considerably bright region of a tunnel exit, the third artificial intelligence model may determine a photographic configuration value (e.g., a high gain value) to capture the region of interest 930 appearing darker.

In a case where the autonomous driving device 100 changes the current photographic configuration values of the camera 101 to those determined by the third artificial intelligence model, the camera 101 may obtain an enhanced RGB image 1000 based on the changed photographic configuration values. For example, the enhanced RGB image 1000 may be generally darker than the RGB image 910, and features or edges may appear in the region of interest 1030 of the enhanced RGB image 1000. Therefore, the autonomous driving device 100 may recognize an object in the region of interest 1030 of the enhanced RGB image 1000.

Referring to FIG. 11, the autonomous driving device 100 may obtain the RGB image 1110 through the camera 101 and the DVS image 1120 through the dynamic vision sensor 102 when entering a tunnel. The RGB image 1110 and the DVS image 1120 may be transmitted to the AI processor 900. The AI processor 900 may input the RGB image 1110 and the DVS image 1120 to the second artificial intelligence model. In this case, the second artificial intelligence model may compare the RGB image 1110 with the DVS image 1120 and determine that only a few features or edges are detected from a tunnel entrance region 1111 in the RGB image 1110 while a lot of features or edges are detected from the tunnel entrance region 1121 in the DVS image 1120. In this case, the second artificial intelligence model may define the tunnel entrance region 1111 of the RGB image 1110, as the region of interest in which an object exists but is not recognized. The second artificial intelligence model may transmit information about the region of interest to the AI processor 900.

The AI processor 900 may apply the RGB image 1110 and the information about the region of interest to the third artificial intelligence model. In this case, the third artificial intelligence model may determine a photographic configuration value for changing the brightness of the region of interest (e.g., the tunnel entrance region 1111) of the RGB image 1110. For example, because the region of interest is a considerably dark region of a tunnel entrance, the third artificial intelligence model may determine a photographic configuration value (e.g., a low gain value) to capture the region of interest appearing brighter.

In a case where the autonomous driving device 100 changes the current photographic configuration values of the camera 101 to those determined by the third artificial intelligence model, the camera 101 may obtain an enhanced RGB image 1130 based on the changed photographic configuration values. For example, the enhanced RGB image 1130 may be generally brighter than the RGB image 1110, and features or edges may appear in the region of interest 1131 of the enhanced RGB image 1130. Therefore, the autonomous driving device 100 may recognize an object in the region of interest 1131 of the enhanced RGB image 1130.

Figure 12:
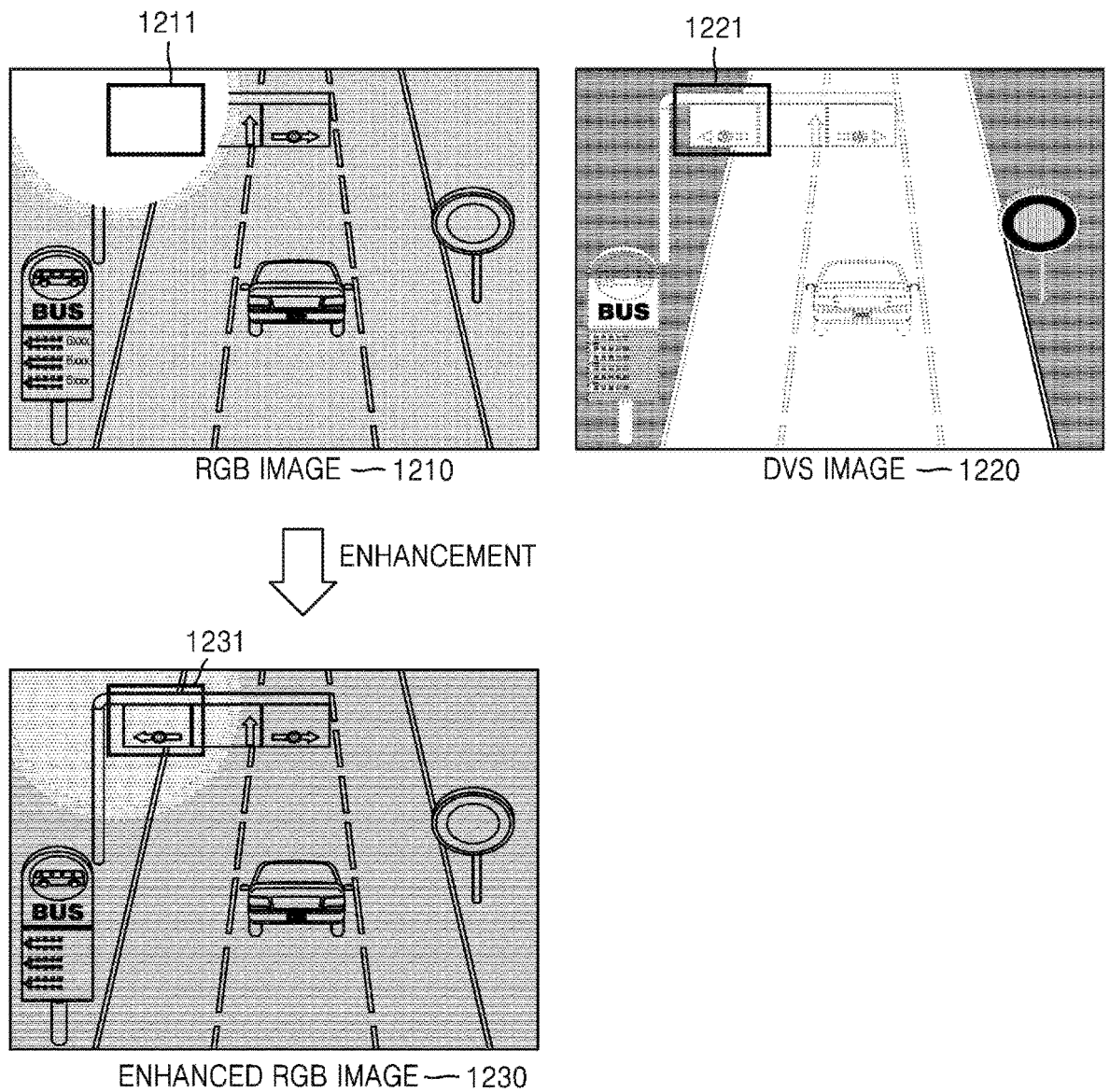
FIG. 12 is a diagram for explaining an operation of controlling photographic configuration information of a camera when an object-unrecognizable region due to a backlight exists in an RGB image, according to an embodiment.

Referring to FIG. 12, the autonomous driving device 100 may obtain an RGB image 1210 through the camera 101 and a DVS image 1220 through the dynamic vision sensor 102, when a backlight occurs in the scene. The RGB image 1210 and the DVS image 1220 may be transmitted to the AI processor 900. The AI processor 900 may input the RGB image 1210 and the DVS image 1220 to the second artificial intelligence model. In this case, the second artificial intelligence model may compare the RGB image 1210 with the DVS image 1220 and determine that only a few features or edges are detected from an upper left region 1211 in the RGB image 1210 while a lot of features or edges are detected from the upper left region 1221 in the DVS image 1220. In this case, the second artificial intelligence model may define the upper left region 1211 in the RGB image 1210, as the region of interest in which an object exists but is not recognized. The second artificial intelligence model may transmit information about the region of interest to the AI processor 900.

The AI processor 900 may apply the RGB image 1210 and the information about the region of interest to the third artificial intelligence model. In this case, the third artificial intelligence model may determine a photographic configuration value for changing the brightness of the region of interest (e.g., the upper left region 1211 appearing bright due to the backlight) of the RGB image 1210. For example, because the region of interest is a considerably bright region, the third artificial intelligence model may determine a photographic configuration value (e.g., a high gain value) to capture the region of interest appearing darker. Alternatively, the third artificial intelligence model may control exposure by adjusting the autofocus point or changing the metering mode.

In a case where the autonomous driving device 100 changes the current photographic configuration values of the camera 101 to those determined by the third artificial intelligence model, the camera 101 may obtain an enhanced RGB image 1230 based on the changed photographic configuration values. For example, the enhanced RGB image 1230 may be generally darker than the RGB image 1210, and features or edges may appear in the region of interest 1231 of the enhanced RGB image 1230. Therefore, the autonomous driving device 100 may recognize an object (e.g., a sign) in the region of interest 1231 of the enhanced RGB image 1230.

In operation S880, in a case where no object has not been recognized from the region of interest (a region(s) corresponding to the at least one second region of the first RGB image) of the second RGB image, the autonomous driving device 100 may control the photographic configuration information of the camera 101 in relation to the at least one second region (region of interest) again. For example, in a case of the region of interest being a dark region, the autonomous driving device 100 may further increase the gain of the camera 101 to capture the region of interest appearing brighter.

In operation S890, the autonomous driving device 100 may obtain the position information of the autonomous driving device 100 by using a recognized object.

Operation S890 corresponds to operation S590 of FIG. 5, its detailed description will be omitted.

Hereinafter, an operation of, in a case where the autonomous driving device 100 has defined a plurality of regions of interest, controlling the photographic configuration information of the camera 101 according to priorities of the plurality of regions of interest will be described in detail with reference to FIGS. 13 and 14.

Figure 13:
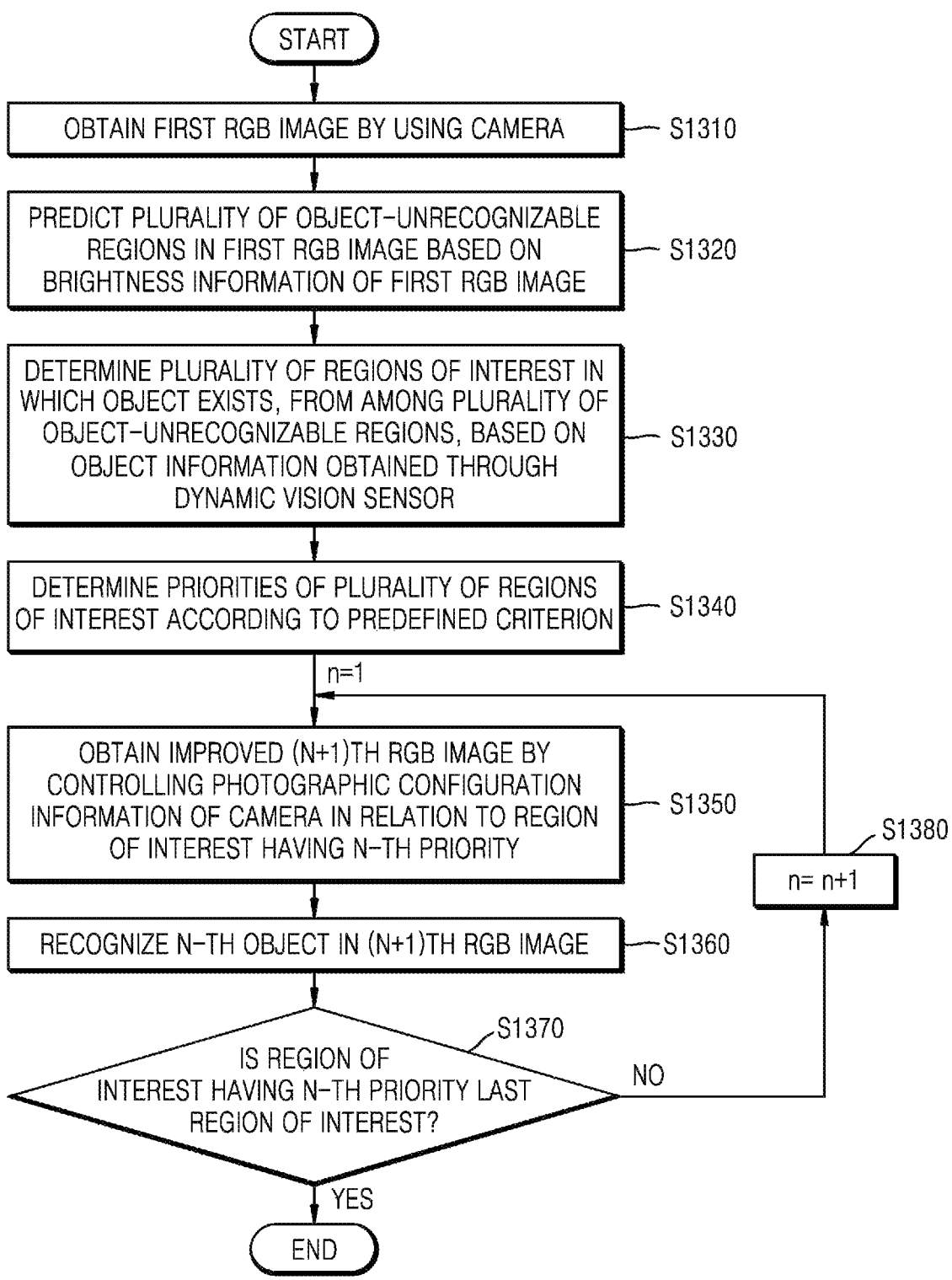
FIG. 13 is a flowchart for explaining a method of controlling photographic configuration information of a camera according to priorities of a plurality of regions of interest, according to an embodiment.

FIG. 13 is a flowchart for explaining a method of controlling photographic configuration information of a camera according to priorities of a plurality of regions of interest, according to an embodiment.

In operation S1310, the autonomous driving device 100 may obtain the first RGB image by using the camera 101.

Operation S1310 corresponds to operation S210 of FIG. 2, its detailed description will be omitted.

In operation S1320, the autonomous driving device 100 may predict a plurality of object-unrecognizable regions in the first RGB image based on the brightness information of the first RGB image.

According to an embodiment, the autonomous driving device 100 may predict the plurality of object-unrecognizable regions in the first RGB image by using the histogram of the first RGB image or the artificial intelligence model.

For example, the autonomous driving device 100 may define, as the object-unrecognizable region, a region in which the brightness values are out of the threshold range in the first RGB image (e.g., a considerably dark or bright region). In this case, in a case where a plurality of regions in which the brightness values are out of the threshold range exist in the first RGB image, the autonomous driving device 100 may detect a plurality of object-unrecognizable regions.

Operation S1320 corresponds to operation S220 of FIG. 2, its detailed description will be omitted.

In operation S1330, the autonomous driving device 100 may determine the plurality of regions of interest in which an object exists, from among the plurality of object-unrecognizable regions, based on the object information obtained through the dynamic vision sensor.

For example, the autonomous driving device 100 may define a plurality of regions in which an object is not captured by the camera 101 but the object is detected by the dynamic vision sensor 102, as the plurality of regions of interest. In this case, brightness values of the plurality of regions of interest may be different from each other. For example, a first region of interest may be a dark region while a second region of interest may be a bright region. Accordingly, it may be difficult to detect all objects in each of the plurality of regions of interest by adjusting the photographic configuration information of the camera 101 only once.

Therefore, in operation S1340, the autonomous driving device 100 may determine priorities of the plurality of regions of interest according to a predefined criterion.

According to an embodiment, the autonomous driving device 100 may assign a region having a low brightness a higher priority. For example, a dark region may have a higher priority than that of a bright region. Alternatively, the autonomous driving device 100 may assign a region having a higher brightness a higher priority. For example, a bright region may have a higher priority than that of a dark region.

According to an embodiment, the autonomous driving device 100 may determine the priorities based on areas of the regions of interest. For example, a priority of a wide region may be higher than that of a narrow region.

Meanwhile, according to an embodiment, the autonomous driving device 100 may determine the priorities of the regions of interest by using surrounding environment information (e.g., context information). For example, in a case where the autonomous driving device 100 is at the tunnel entrance, a region having a low brightness may be assigned a high priority, whereas, in a case where the autonomous driving device 100 is at the tunnel exit, a region having high brightness may be assigned a high priority, but the present disclosure is not limited thereto.

In operations S1350 to S1380, the autonomous driving device 100 may obtain an enhanced RGB image by controlling the photographic configuration information of the camera 101, considering the priorities of the plurality of regions of interest. That is, in operation S1350, the autonomous driving device 100 may obtain an enhanced (n+1)th RGB image by controlling the photographic configuration information of the camera 101 in relation to the region of interest having an n-th priority. In operation S1360, the autonomous driving device 100 may recognize an n-th object in the (n+1)th RGB image. In operation S1370, the autonomous driving device 100 may determine whether a region of interest having an n-th priority is the last region of interest. In operation S1380, in a case where the region of interest having the n-th priority is not the last region of interest, the autonomous driving device 100 may select the region of interest having the (n+1)th priority and perform operations from S1350 again.

For example, the autonomous driving device 100 may obtain the enhanced second RGB image by controlling the photographic configuration information of the camera 101 in relation to the region of interest having a first priority. In this case, the autonomous driving device 100 may recognize a first object in the region of interest (region corresponding to the region of interest having the first priority) of the second RGB image. Then, the autonomous driving device 100 may obtain an enhanced third RGB image by controlling the photographic configuration information of the camera 101 in relation to a region of interest having a second priority. The autonomous driving device 100 may recognize a second object in a region of interest (region corresponding to the region of interest having the second priority) of the third RGB image. Here, the first object and the second object may be different from each other. The autonomous driving device 100 may determine whether the region of interest having the second priority is the last region of interest. When the region of interest having the second priority is not the last region of interest, the autonomous driving device 100 may obtain an enhanced fourth RGB image by controlling the photographic configuration information of the camera 101 in relation to a region of interest having a third priority, and recognize a third object in the region of interest (region corresponding to the region of interest having the third priority) of the enhanced fourth RGB image. That is, the autonomous driving device 100 may control the photographic configuration information of the camera 101 such that objects may be sequentially detected from the regions of interest according to their priorities.

Referring to FIG. 14, an operation of, by the autonomous driving device 100, controlling the photographic configuration information of the camera 101, considering the priorities of the plurality of regions of interest will be described in detail.

FIG. 14 is a diagram for explaining priorities of a plurality of regions of interest, according to an embodiment.

The autonomous driving device 100 may obtain an RGB image 1410 through the camera 101 while passing through a tunnel, and obtain a DVS image 1420 through the dynamic vision sensor 102. In this case, the autonomous driving device 100 may compare the RGB image 1410 with the DVS image 1420 and determine that only a few features or edges are detected from a lower left region (region ①) in the RGB image 1410, but a lot of features or edges are detected from the lower left region (region ①) in the DVS image 1420. In addition, the autonomous driving device 100 may determine that only a few features or edges are detected from a tunnel exit region (region ②) in the RGB image 1410, but a lot of features or edges are detected from the tunnel exit region (region ②) in the DVS image 1420. In this case, the autonomous driving device 100 may define the lower left region (region ①) and the tunnel exit region (region ②) in the RGB image 1410, as the regions of interest.

In a case where a region of interest having a low brightness is set to be assigned a high priority, the autonomous driving device 100 may assign the lower left region (region ①) a higher priority than that of the tunnel exit region (region ②).

In this case, the autonomous driving device 100 may control the photographic configuration information of the camera 101 based on the lower left region (region ①) first. For example, because the lower left region (region ①) is a dark region, the autonomous driving device 100 may increase the gain to capture the lower left region (region ①) appearing brighter. Here, the lower left region (region ①) appears brighter, the autonomous driving device 100 may recognize an object (e.g., an external vehicle) in the lower left region (region ①). Because the gain has been increased and accordingly, the tunnel exit region (region ②) appears even brighter, an object may still not be detected in the tunnel exit region (region ②).

Then, the autonomous driving device 100 may control the photographic configuration information of the camera 101 based on the tunnel exit region (region ②). For example, because the tunnel exit region (region ②) is a bright area, the autonomous driving device 100 may decrease the gain to capture the tunnel exit region (region ②) appearing darker. Here, the tunnel exit region (region ②) appears darker, the autonomous driving device 100 may recognize an object (e.g., a lane, pedestrian bridge, street tree) in the tunnel exit region (region ②).

Figure 15:
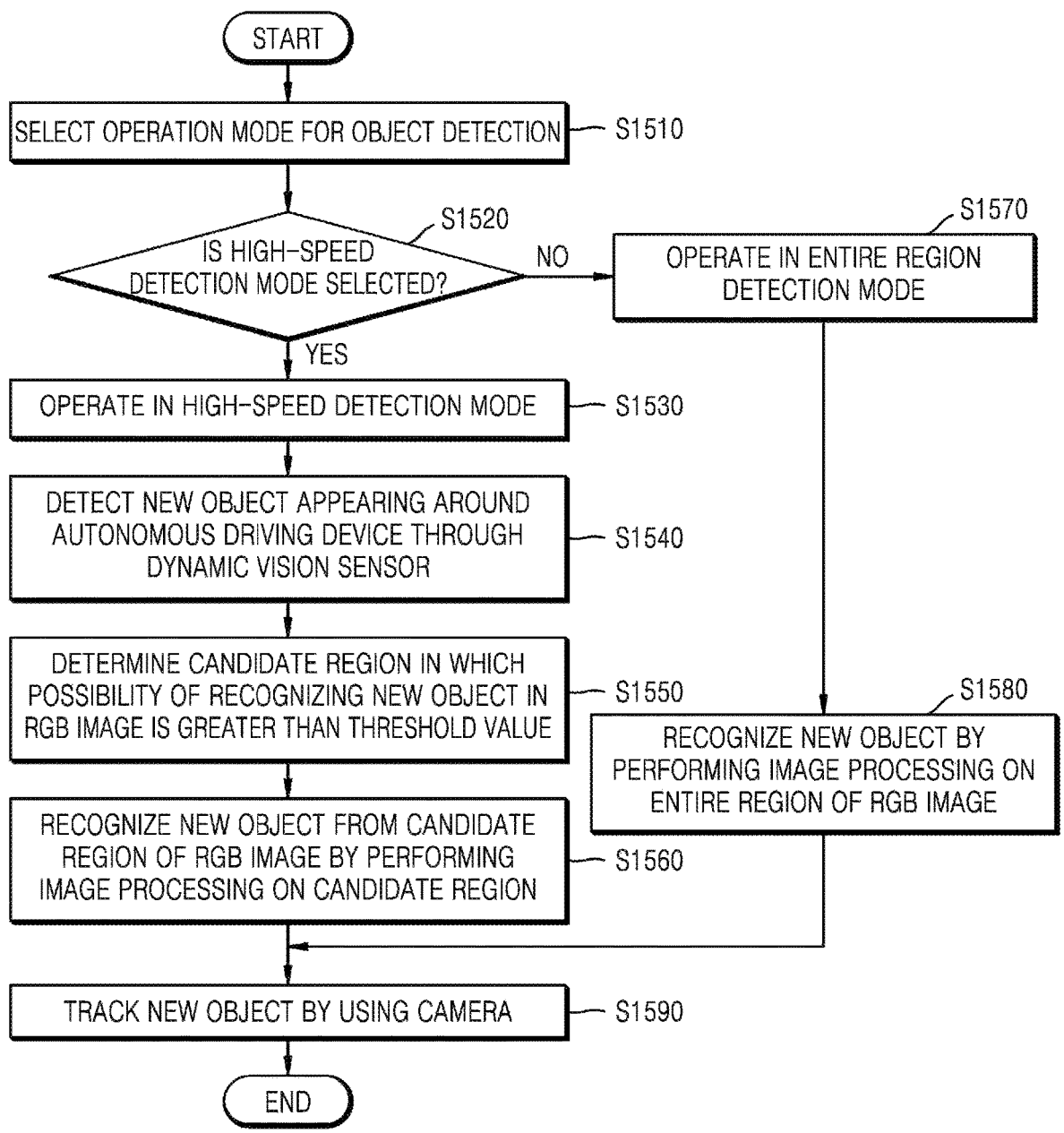
FIG. 15 is a flowchart for explaining a method performed by an autonomous driving device to track an object, according to an embodiment.

FIG. 15 is a flowchart for explaining a method of, by an autonomous driving device, tracking an object, according to an embodiment.

In operation S1510, the autonomous driving device 100 may select an operation mode for object detection. Operation modes for object tracking may include, but is not limited to, a high-speed detection mode and an entire region detection mode.

The high-speed detection mode refers to a mode for detecting an object at a high speed, by performing image processing on a candidate region having a high possibility of detecting an object in an RGB image. The candidate region may be determined based on information detected by the dynamic vision sensor 102.

The entire region detection mode refers to a mode for detecting an object by performing image processing on an entire region of an RGB image.

In operations S1520 and S1530, when the high-speed detection mode is selected, the autonomous driving device 100 may operate in the high-speed detection mode.

According to an embodiment, in a case where a new object has not been detected by the dynamic vision sensor 102, the autonomous driving device 100 may not perform a new object recognition process on the RGB image.

In operation S1540, the autonomous driving device 100 may detect a new object appearing around the autonomous driving device 100 through the dynamic vision sensor. Here, the new object may include a dynamic object (e.g., a vehicle, motorcycle, pedestrian).

Because the dynamic vision sensor 102 obtains data on a per-pixel basis rather than a frame basis, the new object may be detected earlier than the camera 101 does.

According to an embodiment, the new object appearing around the autonomous driving device 100 may be detected by comparing the current frame with the previous frame of the DVS image. For example, when an external vehicle appears in a second lane at the right of the first lane in which the autonomous driving device 100 is driving, the dynamic vision sensor 102 may detect the external vehicle earlier than the camera 101 does. Here, an outline of the external vehicle may appear in a right region of the DVS image.

In operation S1550, the autonomous driving device 100 may determine the candidate region in which the possibility of recognizing a new object in the RGB image is greater than a threshold value.

According to an embodiment, the autonomous driving device 100 may determine the candidate region in the RGB image based on information about from where the new object appears on the DVS image. For example, in a case where the new object appears from a right region of the autonomous driving device 100 as a result of analyzing the DVS image, the autonomous driving device 100 may define the right region in the RGB image as the candidate region.

In operation S1560, the autonomous driving device 100 may recognize the new object from the candidate region of the RGB image by performing image processing on the candidate region.

According to an embodiment, the autonomous driving device 100 may extract at least one feature that constitutes the object, from the candidate region. The autonomous driving device 100 may recognize the object in the candidate region by using the extracted at least one feature. For example, the autonomous driving device 100 may recognize the external vehicle that is traveling in the right lane in the candidate region of the RGB image. In this case, because the autonomous driving device 100 does not need to perform the image processing on the entire region of the RGB image in order to recognize the new object, a speed and accuracy in recognizing an object may be improved.

In operation S1570, when the high-speed detection mode is not selected, the autonomous driving device 100 may operate in the entire region detection mode.

According to an embodiment, in a case where an image processing capability is sufficient or in a case of a critical event, the autonomous driving device 100 may select the entire region detection mode. Alternatively, the autonomous driving device 100 may periodically operate in the entire region detection mode.

In operation S1590, when the autonomous driving device 100 operates in the entire region detection mode, the autonomous driving device 100 may recognize the new object by performing the image processing on the entire region of the RGB image.

In operation S1590, the autonomous driving device 100 may track the new object by using the camera 101.

According to an embodiment, the autonomous driving device 100 may track a change in the new object based on feature information of the new object extracted from a series of frames of an RGB image. For example, the autonomous driving device 100 may track a change in a position of the new object. According to an embodiment, the autonomous driving device 100 may mark an identification image around an object that is being tracked.

According to an embodiment, some of operations S1510 to S1590 may be omitted, and the order of some of operations S1510 to S1590 may be changed.

FIG. 16 is a diagram for explaining an operation of, by an autonomous driving device, recognizing and tracking a new object detected by a dynamic vision sensor using a camera.

Referring to a first RGB image 1610 of FIG. 16, the autonomous driving device 100 may recognize and track objects moving in front of the autonomous driving device 100 by using a front camera 101. For example, the autonomous driving device 100 may recognize and track a first vehicle 1601, a second vehicle 1602, and a third vehicle 1603.

Referring to a DVS image 1620 of FIG. 16, the autonomous driving device 100 may detect a new object 1621 approaching the autonomous driving device 100 by using the dynamic vision sensor 102. For example, the autonomous driving device 100 may detect an outline of a fourth vehicle 1621 approaching the left of the autonomous driving device 100, from the DVS image 1620.

Referring to a second RGB image 1630 of FIG. 16, in a case where the new object has been detected through the dynamic vision sensor 1620, the autonomous driving device 100 may determine the candidate region in which the probability of recognizing the new object in the second RGB image 1630 obtained through the camera 101 is greater than the threshold value. For example, in a case where the autonomous driving device 100 has recognized that the new object is approaching the left of the autonomous driving device 100, through the DVS image 1620, and thus the autonomous driving device 100 may define a left region 1631 of the second RGB image 1630 as the candidate region.

The autonomous driving device 100 may recognize the fourth vehicle 1621 by performing the image processing on the left region 1631 of the second RGB image 1630. In addition, the autonomous driving device 100 may track the fourth vehicle 1621 together with the first to third vehicles 1601 to 1603 by using the camera 101.

According to an embodiment, the autonomous driving device 100 may predict a presence and position of the new object through the dynamic vision sensor 102, and thus may rapidly recognize and track the new object on the RGB image.

Figure 17:
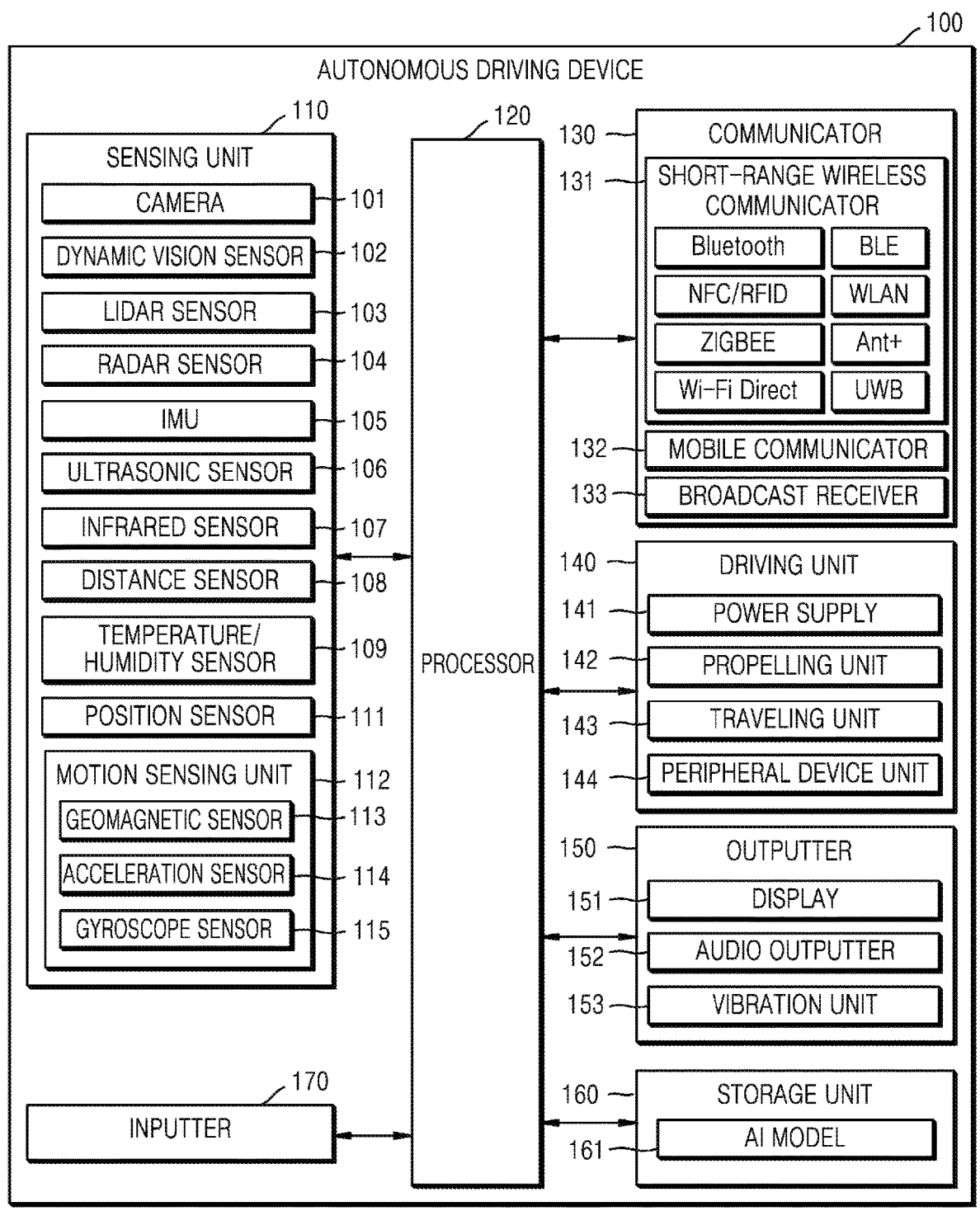
FIG. 17 is a block diagram for explaining a configuration of an autonomous driving device, according to an embodiment.

FIG. 17 is a block diagram for explaining a configuration of an autonomous driving device, according to an embodiment.

Referring to FIG. 17, the autonomous driving device 100 may include a sensing unit 110, a processor 120, a communicator 130, a driving unit 140, an outputter 150, a storage unit 160, and an inputter 170. However, all components shown in FIG. 17 are not indispensable components of the autonomous driving device 100. The autonomous driving device 100 may be implemented by more components than the components illustrated in FIG. 17, or by fewer components than the components illustrated in FIG. 17. For example, as shown in FIG. 1, the autonomous driving device 100 may include the camera 101, the dynamic vision sensor 102, and the processor 120. The components will be described in order.

The sensing unit 110 may include a plurality of sensors configured to detect information about a surrounding environment of the autonomous driving device 100. For example, the sensing unit 110 may include the camera 101 (e.g., a stereo camera, a mono camera, a wide angle camera, an around-view camera, or a three-dimensional vision sensor), the dynamic vision sensor 102, a lidar sensor 103, a radar sensor 104, an inertial sensor (inertial measurement unit (IMU)) 105, an ultrasonic sensor 106, an infrared sensor 107, a distance sensor 108, a temperature/humidity sensor 109, a position sensor 111 (e.g., a global positioning system (GPS), differential GPS (DGPS), an inertial navigation system (INS)), and a motion sensing unit 112, but is not limited thereto.

The motion sensing unit 112 may detect a motion of the autonomous driving device 100, and may include, for example, a geomagnetic sensor 113, an acceleration sensor 114, and a gyroscope sensor 115, but is not limited thereto.

According to an embodiment, the camera 101 may include a plurality of cameras, and the plurality of cameras may be arranged at a plurality of locations inside or outside the autonomous driving device 100. For example, three cameras may be arranged in a front portion, one camera may be arranged in a rear portion, two cameras may be arranged in a left side portion, and two cameras may be arranged in a right side portion of the autonomous driving device 100, but the present disclosure is not limited thereto. A function of each sensor may be intuitively deduced from the name by one of ordinary skill in the art, and thus a detailed description thereof is omitted.

The processor 120 may generally control the overall operation of the autonomous driving device 100. The processor 120 may control the sensing unit 110, the communicator 130, the driving unit 140, the outputter 150, the storage unit 160, and the inputter 170 by executing programs stored in the storage unit 160.

The processor 120 may obtain the first RGB image by using the camera 101.

The processor 120 may analyze the first RGB image to obtain the histogram of the first RGB image, and determine whether the object-unrecognizable region exists in the first RGB image by using the histogram of the first RGB image.

In a case where it has been determined that the object-unrecognizable region exists in the first RGB image, the processor 120 may predict the at least one first region in the first RGB image based on the brightness information of the first RGB image. For example, the processor 120 may define, as the at least one first region, a region in which the brightness values are out of the threshold range in the first RGB image.

The processor 120 may determine the at least one second region in which an object exists from among the at least one first region, based on the object information obtained through the dynamic vision sensor 102. The processor 120 may obtain the enhanced second RGB image by controlling the photographic configuration information of the camera 101 in relation to the at least one second region. For example, the processor 120 may control the photographic configuration information of the camera 101 by adjusting at least one of the gain, aperture, and exposure time of the camera 101.

The processor 120 may recognize the object in the second RGB image. The processor 120 may track the object recognized in the second RGB image by using the camera 120. The processor 120 may detect the new object appearing around the autonomous driving device 100 through the dynamic vision sensor 102, and may determine the candidate region in which the probability of recognizing the new object in the third RGB image obtained through the camera 101 is greater than the threshold value. The processor 120 may recognize the new object detected by the dynamic vision sensor 102 from the third RGB image by performing the image processing on the candidate region.

The processor 120 may set the frame rate of the dynamic vision sensor 102 to be the same as that of the camera 101.

According to an embodiment, the processor 120 may include the artificial intelligence (AI) processor. In this case, the AI processor may determine whether the object-unrecognizable region exists in the first RGB image by using the first artificial intelligence model that has been trained from a plurality of RGB images, and when it has been determined that the object-unrecognizable region exists in the first RGB image, the AI processor may predict the at least one first region (object-unrecognizable region) in the first RGB image by using the first artificial intelligence model. In addition, the processor 120 may plan a motion of the autonomous driving device 100 by using a learned network model of an AI system.

The AI processor may be manufactured in the form of an AI-dedicated hardware chip or may be manufactured as part of an existing general purpose processor (e.g., a CPU or application processor) or a dedicated graphics processor (e.g., a GPU) and mounted on the autonomous driving device 100.

The communicator 130 may include at least one antenna for wirelessly communicating with another device (e.g., an external vehicle or external server). For example, the communicator 130 may include one or more components that allow communication between the autonomous driving device 100 and an external vehicle or between the autonomous driving device 100 and a server. For example, the communicator 130 may include a short-range wireless communicator 131, a mobile communicator 132, and a broadcast receiver 133, but is not limited thereto.

The short-range wireless communicator 131 may include, but is not limited to, a Bluetooth communicator, a Bluetooth low energy (BLE) communicator, a near field communicator (NFC), a Wi-Fi (WLAN) communicator, a Zigbee communicator, an infrared data association (IrDA) communicator, a Wi-Fi direct (WFD) communicator, an ultra wideband (UWB) communicator, an Ant+ communicator, a microwave communicator, etc.

The mobile communicator 132 may transmit and receive a wireless signal to and from at least one of a base station, an external terminal, and a server on a mobile communication network. Here, the wireless signals may include various types of data based on transmission and reception of voice call signals, video call signals, or text/multimedia messages.

The broadcast receiver 133 may receive broadcast signals and/or broadcast-related information through broadcast channels from outside. The broadcast channels may include satellite channels and terrestrial channels. According to an embodiment, the autonomous driving device 100 may not include the broadcast receiver 133.

According to embodiments, the communicator 130 may perform vehicle-to-vehicle (V2V) communication with an external vehicle located within a certain distance from the autonomous driving device 100, or perform vehicle-to-infrastructure (V2I) communication with infrastructure located within a certain distance from the autonomous driving device 100. For example, the communicator 130 may broadcast or advertise a packet including identification information, a position, or speed of the autonomous driving device 100. Also, the communicator 130 may receive a packet broadcasted or advertised by the external vehicle.

The driving unit 140 may include elements used for driving (operating) the autonomous driving device 100 and for performing operations of devices in the autonomous driving device 100. The driving unit 140 may include at least one of a power supply 141, a propelling unit 142, a traveling unit 143, and a peripheral device unit 144, but is not limited thereto.

The peripheral device unit 144 may include a navigation system, a light, a turn signal lamp, a wiper, an internal light, a heater, and an air conditioner. The navigation system may be a system configured to determine a driving route for the autonomous driving device 100. The navigation system may be configured to dynamically update the driving route while the autonomous driving device 100 is traveling. For example, the navigation system may utilize data collected by a GPS module to determine the driving route for the autonomous driving device 100.

The outputter 150 may output an audio signal, a video signal, or a vibration signal, and may include a display 151, an audio outputter 152, a vibration unit 153, etc.

The display 151 may display and output information processed in the autonomous driving device 100. For example, the display 151 may display a map including a driving route, display positions of external vehicles, display blind spots of drivers of the external vehicles, or display a current speed, a remaining fuel amount, information for guiding the driving route of the autonomous driving device 100, etc., but is not limited thereto. The display 151 may display a user interface (UI) or a graphic user interface (GUI) associated with a call in a call mode.

Meanwhile, when the display 151 and a touch pad have a layer structure and are configured as a touch screen, the display 151 may be used as an input device in addition to an output device. The display 151 may include at least one of a liquid crystal display, a thin film transistor-liquid crystal display, an organic light-emitting diode, a flexible display, a three-dimensional (3D) display, an electrophoretic display, etc. The autonomous driving device 100 may include two or more displays 151 according to an implementation of the device 100.

According to one embodiment, the display 151 may include a transparent display. The transparent display may be implemented in a projection type in addition to a transparent liquid crystal display (LCD) type, a transparent thin-film electroluminescent panel (TFEL) type, and a transparent organic light emitting diode (OLED) type. The projection type refers to a method of projecting and displaying an image on a transparent screen such as a head-up display (HUD).

The sound outputter 152 may output audio data received from the communicator 130 or stored in the storage unit 160. In addition, the sound outputter 152 may output a sound signal related to a function performed in the autonomous driving device 100. For example, the sound outputter 152 may output a voice message for guiding the driving route of the autonomous driving device 100. The audio outputter 152 may include a speaker, a buzzer, etc.

The vibration unit 153 may output a vibration signal. For example, the vibration unit 153 may output a vibration signal corresponding to an output of audio data or video data (e.g., a warning message).

The storage unit 160 may store a program for processing and control of the processor 120, and may store input/output data (e.g., an RGB image, DVS image, road situation information, precision map, histogram). The storage unit 160 may store an artificial intelligence model 161.

The storage unit 160 may include at least one type of storage medium of a flash memory type, a hard disk type, a multimedia card micro type, a card type memory (for example, SD or XD memory), random access memory (RAM), a static random access memory (SRAM), read only memory (ROM), electrically erasable programmable read-only memory (EEPROM), programmable read-only memory (PROM), a magnetic memory, a magnetic disk, an optical disk, or the like. Also, the autonomous driving device 100 may operate a web storage or a cloud server that performs a storage function on the Internet.

The inputter 170 refers to a means through which a user inputs data for controlling the autonomous driving device 100. For example, the inputter 170 may include a key pad, a dome switch, a touch pad (contact type capacitance type, pressure type resistive type, infrared ray detection type, surface ultrasonic wave conduction type, an integral tension measurement type, a piezo effect type, etc.), a jog wheel, a jog switch, and the like, but is not limited thereto.

Figure 18:
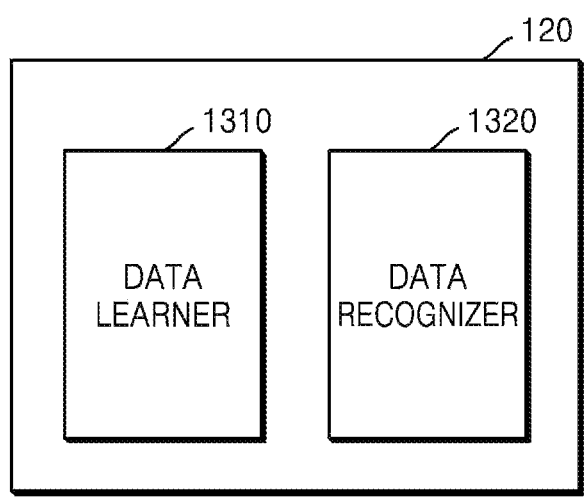
FIG. 18 is a block diagram of a processor, according to an embodiment.

FIG. 18 is a block diagram of a processor, according to an embodiment.

Referring to FIG. 18, the processor 120 may include a data learner 1310 and a data recognizer 1320.

The data learner 1310 may learn a standard for determining an object recognition situation. For example, the data learner 1310 may learn a standard for determining a situation in which it is difficult to recognize an object through the camera 101 (e.g., entering a tunnel, exiting a tunnel, backlighted in evening or dawn, driving at night, passing through a region with extreme changes in illumination, passing through a shadowed region). Also, the data learner 1310 may learn a standard for identifying the object-unrecognizable region in the RGB image, or a standard for determining the region of interest in the RGB image, based on the object information of the dynamic vision sensor 102. The data learner 1310 may also learn a standard about which data is used to determine the photographic configuration information of the camera 101 and how to determine the photographic configuration information by using the data. The data learner 1310 may obtain data (e.g., an image) to be used for learning, apply the obtained data to a data recognition model that will be described below, and learn a standard for recognizing an object through the camera 101

According to an embodiment, the data learner 1310 may learn personalized data. For example, the data learner 1310 may learn RGB images, context information, etc. obtained from a route through which the autonomous driving device

100 frequently travels. According to an embodiment, the data learner 1310 may learn a standard for planning a motion of the autonomous driving device 100, or may learn a standard for recognizing a position of the autonomous driving device 100.

The data recognizer 1320 may determine the object recognition situation based on the data. The data recognizer 1320 may determine the object recognition situation from the detected data by using the trained data recognition model. The data recognizer 1320 may obtain image data (e.g., an RGB image or DVS image) according to a predefined standard by learning, and use the data recognition model by using the obtained image data as an input value to perform object recognition based on the image data. In addition, a result value output by the data recognition model by using the obtained image data as the input value may be used to refine the data recognition model.

At least one of the data learner 1310 and the data recognizer 1320 may be manufactured in the form of at least one hardware chip and mounted on the autonomous driving device 100. For example, at least one of the data learner 1310 and the data recognizer 1320 may be manufactured in the form of a dedicated hardware chip for artificial intelligence (AI), or may be manufactured as a part of an existing general purpose processor (e.g., a CPU or application processor) or a dedicated graphics processor (e.g., a GPU) and mounted on the autonomous driving device 100.

In this case, the data learner 1310 and the data recognizer 1320 may be mounted on a single autonomous driving device 100, or may be separately mounted on electronic devices. For example, one of the data learner 1310 and the data recognizer 1320 may be included in the autonomous driving device 100, and the remaining one may be included in a server 200. Also, model information established by the data learner 1310 may be provided to the data recognizer 1320 and data input to the data recognizer 1320 may be provided as additional training data to the data learner 1310 by wire or wirelessly.

At least one of the data learner 1310 and the data recognizer 1320 may be implemented as a software module. When at least one of the data learner 1310 and the data recognizer 1320 is implemented as a software module (or a program module including instructions), the software module may be stored in a non-transitory computer-readable recording medium. Also, in this case, at least one software module may be provided by an operating system (OS) or a predefined application. Alternatively, a part of at least one software module may be provided by an operating system (OS), and the remaining part may be provided by a predefined application.

Figure 19:
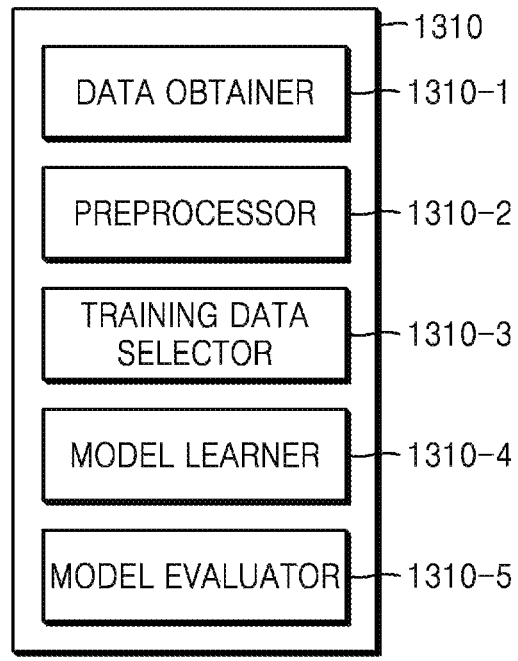
FIG. 19 is a block diagram of a data learner, according to an embodiment.

FIG. 19 is a block diagram of the data learner 1310, according to an embodiment.

Referring to FIG. 19, the data learner 1310 according to an embodiment may include a data obtainer 1310-1, a preprocessor 1310-2, a training data selector 1310-3, a model learner 1310-4, and a model evaluator 1310-5.

The data obtainer 1310-1 may obtain data needed to determine the object recognition situation. The data obtainer 1310-1 may obtain data (e.g., an RGB image or DVS image) necessary for learning to determine the object recognition situation. According to an embodiment, the data obtainer 1310-1 may directly generate data needed to determine the object recognition situation or may receive the data needed to determine the object recognition situation from an external device or a server.

According to an embodiment, the data needed to determine the object recognition situation may include, but is not limited to, an RGB image, object information of the dynamic vision sensor 100, surrounding environment information of the autonomous driving device 100, personalized training data, etc.

The preprocessor 1310-2 may preprocess the obtained data to be used for learning to determine the object recognition situation. The pre-processor 1310-2 may process the obtained data into a predefined format such that the model learner 1310-4 that will be described below may use the obtained data for learning to determine the object recognition situation.

The training data selector 1310-3 may select data needed for learning from among the pieces of preprocessed data. The selected data may be provided to the model learner 1310-4. The training data selector 1310-3 may select the data needed for learning from the preprocessed data according to a predefined standard for determining the object recognition situation. Also, the training data selector 1310-3 may select data based on a predefined standard according to learning by the model learner 1310-4 that will be described below.

The model learner 1310-4 may learn a standard about how to determine the object recognition situation based on the training data. In addition, the model learner 1310-4 may learn a standard about which training data is to be used to determine the object recognition situation.

In addition, the model learner 1310-4 may train a data recognition model used to determine the object recognition situation by using the training data. In this case, the data recognition model may be a model that is pre-established. For example, the data recognition model may be a model that is pre-established by receiving basic training data (e.g., sample images).

The data recognition model may be established in consideration of a field to which a recognition model is applied, the purpose of learning, or the computer performance of the autonomous driving device 100. The data recognition model may be, for example, a model based on a neural network. For example, a model such as a deep neural network (DNN), a recurrent neural network (RNN), or a bidirectional recurrent deep neural network (BRDNN) may be used as the data recognition model, but the present disclosure is not limited thereto.

According to various embodiments, when a plurality of data recognition models that are pre-established exist, the model learner 1310-4 may determine a data recognition model having a high relationship between input training data and basic training data as the data recognition model to be trained. In this case, the basic training data may be pre-classified according to types of data, and the data recognition model may be pre-established according to the types of data. For example, the basic training data may be pre-classified according to various standards such as an area where the training data is generated, a time for which the training data is generated, a size of the training data, a genre of the training data, a generator of the training data, and a type of the subject in the training data.

Also, the model learner 1310-4 may train the data recognition model by using a learning algorithm including, for example, error back-propagation or gradient descent.

Also, the model learner 1310-4 may train the data recognition model through supervised learning by using, for example, the training data as an input value. Also, the model learner 1310-4 may train the data recognition model through unsupervised learning to find a standard for determining a situation by learning a type of data needed to determine the situation by itself without supervision. Also, the model learner 1310-4 may train the data recognition model through reinforcement learning using a feedback about whether a result of determining the object recognition situation according to learning is right.

Also, when the data recognition model has been trained, the model learner 1310-4 may store the trained data recognition model. In this case, the model learner 1310-4 may store the trained data recognition model in the storage unit 160 of the autonomous driving device 100 including the data recognizer 1320. Alternatively, the model learner 1310-4 may store the trained data recognition model in the storage unit 160 of the autonomous driving device 100 including the data recognizer 1320 that will be described below. Alternatively, the model learner 1310-4 may store the trained data recognition model in a memory of the server 200 connected to the autonomous driving device 100 through a wired or wireless network.

In this case, the storage unit 160 in which the trained data recognition model is stored may also store, for example, a command or data related to at least one other component of the autonomous driving device 100. Also, the storage unit 160 may store software and/or programs. The programs may include, for example, a kernel, middleware, an application programming interface (API) and/or an application program (or "application").

The model evaluator 1310-5 may input evaluation data to the data recognition model, and may allow the model learner 1310-4 to re-train the data recognition model when a recognition result output on the evaluation data does not satisfy a predefined criterion. In this case, the evaluation data may be predefined data for evaluating the data recognition model.

For example, from among recognition results of the trained data recognition model output on the evaluation data, when the number or a ratio of incorrect recognition results exceeds a predefined threshold value, the model evaluator 1310-5 may evaluate that the predefined criterion is not satisfied. For example, when the predefined criterion is 2% and incorrect recognition results are output on more than 20 pieces of evaluation data from among 1000 pieces of evaluation data, the model evaluator 1310-5 may evaluate that the trained data recognition model is not suitable.

When a plurality of trained data recognition models exist, the model evaluator 1310-5 may evaluate whether each of the trained data recognition models satisfies the predefined criterion, and may define a model satisfying the predefined criterion as a final data recognition model. In this case, when a plurality of models satisfy the predefined criterion, the model evaluator 1310-5 may define one that is preset or a preset number of models in a descending order of evaluation scores as final data recognition models.

At least one of the data obtainer 1310-1, the pre-processor 1310-2, the training data selector 1310-3, the model learner 1310-4, and the model evaluator 1310-5 in the data learner 1310 may be manufactured as at least one hardware chip and may be mounted on the autonomous driving device 100. For example, at least one of the model learner 1310-4, the pre-processor 1310-2, the training data selector 1310-3, the model learner 1310-4, and the model evaluator 1310-5 may be manufactured in the form of a dedicated hardware chip for artificial intelligence (AI), or may be manufactured as a part of an existing general purpose processor (e.g., a CPU or application processor) or a dedicated graphics processor (e.g., a GPU) and mounted on the autonomous driving device 100.

Also, the data obtainer 1310-1, the preprocessor 1310-2, the training data selector 1310-3, the model learner 1310-4, and the model evaluator 1310-5 may be mounted on a single autonomous driving device 100, or may be separately mounted on electronic devices For example, some of the data obtainer 1310-1, the preprocessor 1310-2, the training data selector 1310-3, the model learner 1310-4, and the model evaluator 1310-5 may be included in the autonomous driving device 100, and the rest may be included in the server 200.

At least one of the data obtainer 1310-1, the preprocessor 1310-2, the training data selector 1310-3, the model learner 1310-4, and the model evaluator 1310-5 may be implemented as a software module. When at least one of the data obtainer 1310-1, the preprocessor 1310-2, the training data selector 1310-3, the model learner 1310-4, and the model evaluator 1310-5 is implemented as a software module (or a program module including instructions), the software module may be stored in a non-transitory computer readable medium. In this case, the at least one software module may be provided by an operating system (OS) or a predefined application. Alternatively, a part of the at least one software module may be provided by an operating system (OS), and the remaining part may be provided by a predefined application.

Figure 20:
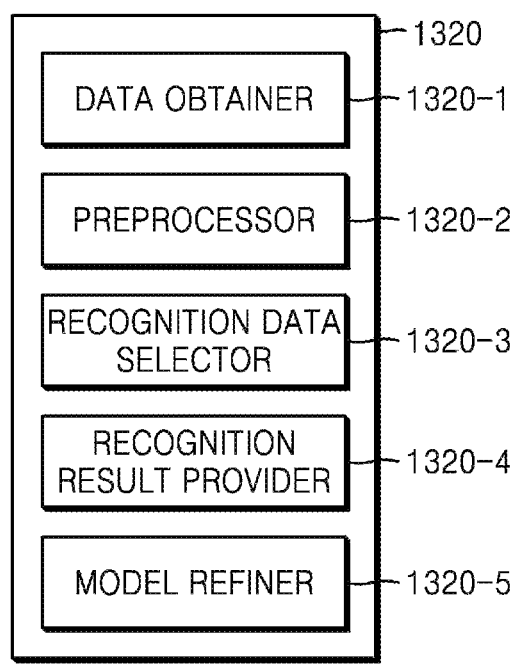
FIG. 20 is a block diagram of a data recognizer, according to an embodiment

FIG. 20 is a block diagram of the data recognizer 1320, according to an embodiment.

Referring to FIG. 20, the data recognizer 1320 according to an embodiment may include a data obtainer 1320-1, a preprocessor 1320-2, a recognition data selector 1320-3, a recognition result provider 1320-4, and a model refiner 1320-5.

The data obtainer 1320-1 may obtain the data needed to determine the object recognition situation, and the preprocessor 1320-2 may preprocess the obtained data such that the obtained data may be used to determine the object recognition situation. The preprocessor 1320-2 may process the obtained data into a predefined format such that the recognition result provider 1320-4 that will be described below may use the obtained data for determining the object recognition situation.

The recognition data selector 1320-3 may select the data needed to determine the object recognition situation from among the pieces of preprocessed data. The selected data may be provided to the recognition result provider 1320-4. The recognition data selector 1320-3 may select some or all of the pieces of preprocessed data according to a preset standard for determining the object recognition situation. Also, the recognition data selector 1320-3 may select data according to a standard preset by learning by the model learner 1310-4 as described below.

The recognition result provider 1320-4 may determine the object recognition situation by applying the selected data to the data recognition model. The recognition result provider 1320-4 may provide a recognition result according to recognition purpose of the data. The recognition result provider 1320-4 may apply the selected data to the data recognition model by using the data selected by the recognition data selector 1320-3 as an input value. Also, the recognition result may be determined by the data recognition model.

For example, a recognition result of at least one image may be provided as text, a voice, a video, an image, or instructions (e.g., application execution instructions or module function execution instructions). For example, the recognition result provider 1320-4 may provide a recognition result of an object included in the at least one image. The recognition result may include, for example, pose information of the object included in the at least one image, surrounding state information of the object, and motion change information of the object included in a video.

The model refiner 1320-5 may refine the data recognition model based on evaluation of the recognition result provided by the recognition result provider 1320-4. For example, the model refiner 1320-5 may provide the recognition result provided by the recognition result provider 1320-4 to the model learner 1310-4 such that the model learner 1340-4 refines the data recognition model.

At least one of the data obtainer 1320-1, the preprocessor 1320-2, the recognition data selector 1320-3, the recognition result provider 1320-4, and the model refiner 1320-5 in the data recognizer 1320 may be manufactured as at least one hardware chip and may be mounted on the autonomous driving device 100. For example, at least one of the data obtainer 1320-1, the preprocessor 1320-2, the recognition data selector 1320-3, the recognition result provider 1320-4, and the model refiner 1320-5 may be manufactured in the form of a dedicated hardware chip for artificial intelligence (AI), or may be manufactured as a part of an existing general purpose processor (e.g., a CPU or application processor) or a dedicated graphics processor (e.g., a GPU) and mounted on the autonomous driving device 100.

Also, the data obtainer 1320-1, the preprocessor 1320-2, the recognition data selector 1320-3, the recognition result provision unit 1320-4, and the model refiner 1320-5 may be mounted on a single autonomous driving device 100, or may be separately mounted on electronic devices. For example, some of the data obtainer 1320-1, the preprocessor 1320-2, the recognition data selector 1320-3, the recognition result provision unit 1320-4, and the model refiner 1320-5 may be included in the autonomous driving device 100, and the rest may be included in a server 200.

At least one of the data obtainer 1320-1, the preprocessor 1320-2, the recognition data selector 1320-3, the recognition result provider 1320-4, and the model refiner 1320-5 may be implemented as a software module. When at least one of the data obtainer 1320-1, the preprocessor 1320-2, the recognition data selector 1320-3, the recognition result provider 1320-4, and the model refiner 1320-5 is implemented as a software module (or a program module including instructions), the software module may be stored in a non-transitory computer readable medium. Also, in this case, at least one software module may be provided by an operating system (OS) or a predefined application. Alternatively, a part of at least one software module may be provided by an operating system (OS), and the remaining part may be provided by a predefined application.

Figure 21:
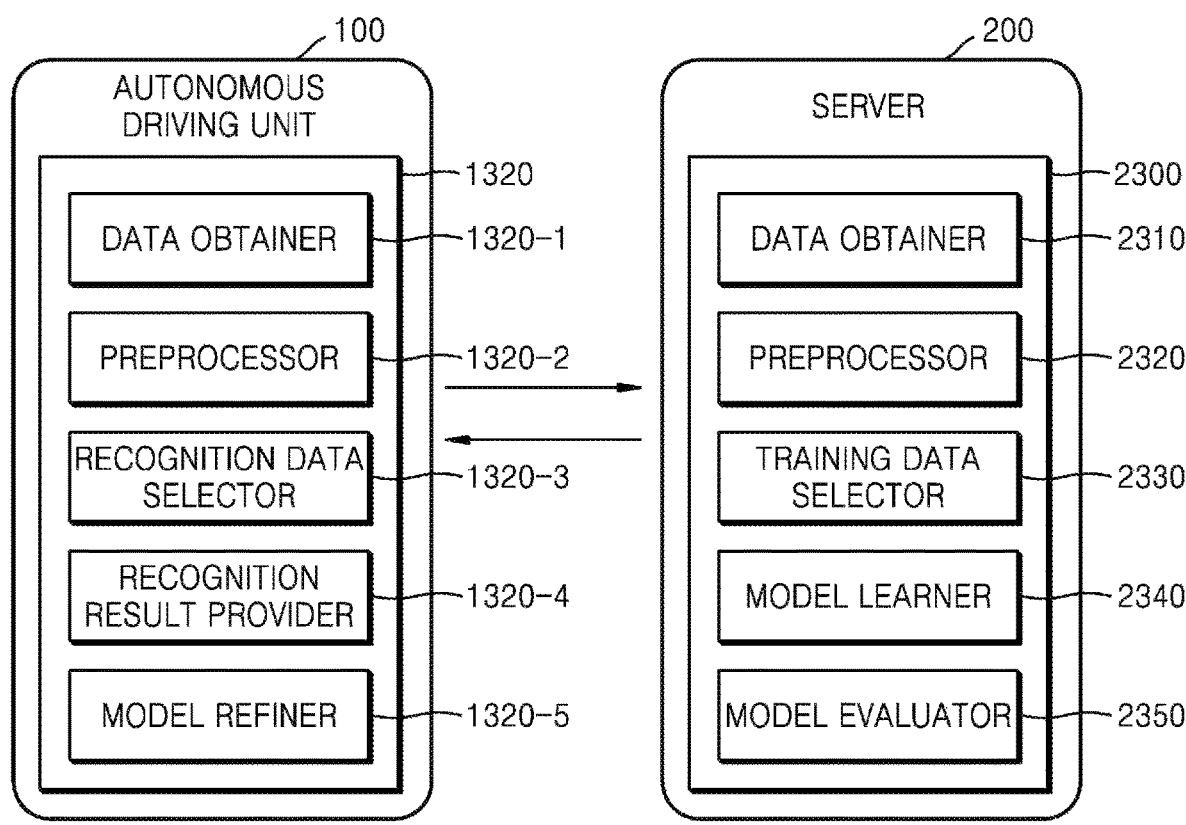
FIG. 21 is a diagram illustrating an example in which an autonomous driving device and a server interoperate to learn and recognize data, according to an embodiment.

FIG. 21 is a diagram illustrating an example in which the autonomous driving device 100 and the server 200 interoperate to learn and recognize data, according to an embodiment.

Referring to FIG. 21, the server 200 may learn a standard for determining the object recognition situation, and the autonomous driving device 100 may determine the object recognition situation based on a result of learning by the server 200.

In this case, a model learner 2340 of the server 200 may perform functions of the data trainer 1310 shown in FIG. 19. The model learner 2340 of the server 200 may learn a standard about which data is used to determine the object recognition situation and how to determine the object recognition situation by using the data. The model learner 2340 may obtain data to be used for learning, apply the obtained data to the data recognition model that will be described below, and learn a standard for determining the object recognition situation.

Also, the recognition result provider 1320-4 of the autonomous driving device 100 may determine the object recognition situation by applying the data selected by the recognition data selector 1320-3 to the data recognition model generated by the server 200. For example, the recognition result provider 1320-4 may transmit the data selected by the recognition data selector 1320-3 to the server 200, and the server 200 may request the recognition model to determine the object recognition situation by applying the data selected by the recognition data selector 1320-3 to the recognition model. The recognition result provider 1320-4 may receive, from the server 200, information about the object recognition situation determined by the server 200.

Alternatively, the recognition result provider 1320-4 of the autonomous driving device 100 may receive, from the server 200, the recognition model generated by the server 200, and may determine the object recognition situation by using the received recognition model. In this case, the recognition result provider 1320-4 of the autonomous driving device 100 may determine the object recognition situation by applying the data selected by the recognition data selector 1320-3 to the data recognition model received from the server 200.

A method according to an embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the present disclosure or may be well-known to and be usable by one of ordinary skill in the art of computer software. Examples of the computer-readable recording medium include a magnetic medium such as a hard disk, a floppy disk, or a magnetic tape, an optical medium such as a compact disk read-only memory (CD-ROM) or a digital versatile disk (DVD), a magneto-optical medium such as a floptical disk, and a hardware device specially configured to store and execute program commands such as a ROM, a RAM, or a flash memory. Examples of the program commands are advanced language codes that may be executed by a computer by using an interpreter or the like as well as machine language codes made by a compiler.

Some embodiments may be implemented as a recording medium including computer-readable instructions such as a computer-executable program module. The computer-readable medium may be an arbitrary available medium accessible by a computer, and examples thereof include all volatile and non-volatile media and separable and non-separable media. Further, examples of the computer-readable medium may include a computer storage medium and a communication medium. Examples of the computer storage medium include all volatile and non-volatile media and separable and non-separable media, which are implemented by an arbitrary method or technology, for storing information such as computer-readable instructions, data structures, program modules, or other data. The communication medium typically includes computer-readable instructions, data structures, program modules, other data of a modulated data signal, or other transmission mechanisms, and examples thereof include an arbitrary information transmission medium. Also, some embodiments may be implemented as a computer program or a computer program product including computer-executable instructions such as a computer program executed by a computer.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method, performed by an autonomous driving device, of recognizing an object, the method comprising:
   obtaining a first red, green, blue (RGB) image by using a camera arranged in the autonomous driving device;
   predicting at least one first region in which an object is unrecognizable in the first RGB image based on brightness information of the first RGB image;
   determining at least one second region in which an object exists, from among the at least one first region, based on object information obtained through a dynamic vision sensor (DVS) arranged in the autonomous driving device;
   obtaining an enhanced second RGB image by controlling photographic configuration information of the camera in relation to the at least one second region; and
   recognizing the object in the second RGB image.

2. The method of claim 1, wherein the predicting of the at least one first region in which the object is unrecognizable comprises predicting a region in which brightness values are out of a threshold range in the first RGB image as the at least one first region.

3. The method of claim 1, wherein the predicting of the at least one first region in which the object is unrecognizable comprises:
   analyzing the first RGB image to obtain a histogram of the first RGB image;
   determining whether an object-unrecognizable region exists in the first RGB image by using the histogram of the first RGB image; and
   when it is determined that the object-unrecognizable region exists in the first RGB image, predicting the at least one first region in the first RGB image based on the brightness information of the first RGB image.

4. The method of claim 1, wherein the predicting of the at least one first region in which the object is unrecognizable comprises:
   determining whether an object-unrecognizable region exists in the first RGB image by using a first artificial intelligence model that has learned a plurality of RGB images; and
   when it is determined that the object-unrecognizable region exists in the first RGB image, predicting the at least one first region in the first RGB image by using the first artificial intelligence model.

5. The method of claim 1, wherein the object information comprises at least one of a dynamic vision sensor (DVS) image obtained by the dynamic vision sensor and position information of at least one object detected from the DVS image.

6. The method of claim 1, wherein the determining of the at least one second region in which the object exists, from among the at least one first region, comprises determining the at least one second region by applying a DVS image obtained by the dynamic vision sensor and the first RGB image to a second artificial intelligence model.

7. The method of claim 1, wherein the obtaining of the second RGB comprises controlling at least one of an exposure, a focus, and a white balance with respect to the at least one second region.

8. The method of claim 1, wherein the obtaining of the second RGB comprises adjusting at least one of a gain, an aperture, and an exposure time of the camera.

9. The method of claim 1, further comprising obtaining, when the second RGB image is composed of a plurality of frames, position information of the autonomous driving device by tracking a feature included in the object recognized from each of the plurality of frames.

10. The method of claim 1, further comprising determining a route of the autonomous driving device based on information about the recognized object.

11. The method of claim 1, further comprising:
    tracking the recognized object by using the camera;
    detecting a new object appearing around the autonomous driving device by using the dynamic vision sensor;
    determining, in response to the new object being detected, a candidate region in which a probability of recognizing the new object in a third RGB image obtained through the camera is greater than a threshold value; and
    recognizing the new object from the third RGB image by performing image processing on the candidate region.

12. An autonomous driving device comprising:
    a camera;
    a dynamic vision sensor (DVS); and
    at least one processor,
    wherein the at least one processor is configured to:
    obtain a first red, green, blue (RGB) image by using the camera;
    predict at least one first region in which an object is unrecognizable in the first RGB image based on brightness information of the first RGB image;
    determine at least one second region in which an object exists, from among the at least one first region, based on object information obtained through the dynamic vision sensor;
    obtain an enhanced second RGB image by controlling photographing configuration information of the camera in relation to the at least one second region; and
    recognize the object in the second RGB image.

13. The autonomous driving device of claim 12, wherein the at least one processor is further configured to predict a region in which brightness values are out of a threshold range in the first RGB image as the at least one first region.

14. The autonomous driving device of claim 12, wherein the at least one processor is further configured to:
    analyze the first RGB image to obtain a histogram of the first RGB image;
    determine whether an object-unrecognizable region exists in the first RGB image by using the histogram of the first RGB image; and
    when it is determined that the object-unrecognizable region exists in the first RGB image, predict the at least one first region in the first RGB image based on the brightness information of the first RGB image.

15. The autonomous driving device of claim 12, wherein the at least one processor comprises an artificial intelligence processor configured to determine whether an object-unrecognizable region exists in the first RGB image by using a first artificial intelligence model that has learned a plurality of RGB images, and when it is determined that the object-unrecognizable region exists in the first RGB image, predict the at least one first region in the first RGB image by using the first artificial intelligence model.

16. The autonomous driving device of claim 12, wherein the at least one processor is further configured to control photographic configuration information of the camera by adjusting at least one of a gain, aperture, and exposure time of the camera.

17. The autonomous driving device of claim 12, wherein the at least one processor is further configured to:
- track the recognized object by using the camera;
- detect, by using the dynamic vision sensor, a new object appearing around the autonomous driving device;
- determine, in response to the new object being detected, a candidate region in which a probability of recognizing the new object in a third RGB image obtained through the camera is greater than a threshold value; and
- recognize the new object from the third RGB image by performing image processing on the candidate region.

18. The autonomous driving device of claim 12, wherein the at least one processor is further configured to set a frame rate of the dynamic vision sensor to be equal to a frame rate of the camera.

19. The autonomous driving device of claim 12, further comprising at least one of an autonomous driving vehicle, an autonomous flying device, and an autonomous driving robot.

20. A computer program product comprising a recording medium having recorded thereon a program for:
- obtaining a first red, green, blue (RGB) image by using a camera;
- predicting at least one first region in which an object is unrecognizable in the first RGB image based on brightness information of the first RGB image;
- determining at least one second region in which an object exists, from among the at least one first region, based on object information obtained through a dynamic vision sensor (DVS);
- obtaining an enhanced second RGB image by controlling photographing configuration information of the camera in relation to the at least one second region; and
- recognizing the object in the second RGB image.

* * * * *